(12) United States Patent
Hunter et al.

(10) Patent No.: US 12,305,721 B2
(45) Date of Patent: May 20, 2025

(54) COVER FOR A UNIVERSAL JOINT OF A DRIVESHAFT

(71) Applicants: Ryan D. Hunter, Columbia, TN (US); Caleb R. Hunter, Spring Hill, TN (US); Scott D. Hunter, Oroville, CA (US)

(72) Inventors: Ryan D. Hunter, Columbia, TN (US); Caleb R. Hunter, Spring Hill, TN (US); Scott D. Hunter, Oroville, CA (US)

(*) Notice: Subject to any disclaimer, the term of this patent is extended or adjusted under 35 U.S.C. 154(b) by 0 days.

(21) Appl. No.: 18/611,768

(22) Filed: Mar. 21, 2024

(65) Prior Publication Data

US 2024/0255033 A1    Aug. 1, 2024

Related U.S. Application Data

(60) Continuation-in-part of application No. 18/482,328, filed on Oct. 6, 2023, which is a division of application No. 18/174,728, filed on Feb. 27, 2023, now Pat. No. 11,796,009.

(60) Provisional application No. 63/481,857, filed on Jan. 27, 2023.

(51) Int. Cl.
 *F16D 3/84* (2006.01)
(52) U.S. Cl.
 CPC .......... *F16D 3/841* (2013.01); *F16D 2300/26* (2013.01)

(58) Field of Classification Search
 CPC .......... A01D 71/08; F16D 3/84; F16D 3/841; F16D 3/843; F16D 2300/26; F16P 1/02; Y10T 74/219; Y10T 74/2191; Y10T 403/17
 See application file for complete search history.

(56) References Cited

U.S. PATENT DOCUMENTS

| | | | | |
|---|---|---|---|---|
| 1,428,799 | A | * 9/1922 | Neuteboom | F16D 3/848 464/171 |
| 1,589,829 | A | * 6/1926 | Andreassen | F16D 3/84 464/171 |
| 2,960,850 | A | * 11/1960 | Crawford | F16D 3/841 464/178 |
| 3,797,328 | A | * 3/1974 | Quirk | F16D 3/841 74/609 |

(Continued)

FOREIGN PATENT DOCUMENTS

| | | | | |
|---|---|---|---|---|
| DE | 10233509 A1 | * 2/2004 | | F16D 3/843 |
| EP | 0540424 A1 | * 5/1993 | | F16D 3/843 |

(Continued)

*Primary Examiner* — Josh Skroupa
(74) *Attorney, Agent, or Firm* — Sisson & Banyas, Attorneys at Law, LLC; Jeffrey J. Banyas

(57) ABSTRACT

Kits for a cover for a universal joint of a driveshaft include at least a first section and a second section of a cover, at least two cover fasteners, and at least one driveshaft fastener. The at least two cover fasteners configured to connect the first section to the second section, and the at least one driveshaft fastener configured to connect the cover to the driveshaft or to a yoke of the driveshaft without any portion of the cover contacting the universal joint. The kits also include a plurality of inserts and/or a plurality of pads configured to allow the cover to adapt to driveshafts of varying diameters without changing the size or shape of the cover itself.

2 Claims, 20 Drawing Sheets

(56) References Cited

U.S. PATENT DOCUMENTS

| | | | | |
|---|---|---|---|---|
| 4,325,587 | A * | 4/1982 | Seigert | F16D 3/841 464/175 |
| 4,890,948 | A * | 1/1990 | Bondioli | F16D 3/841 464/170 |
| 5,870,931 | A * | 2/1999 | Frantz | F16D 3/841 464/170 |
| 6,159,104 | A * | 12/2000 | Mikeska | F16D 3/841 464/170 |
| 6,171,010 | B1 * | 1/2001 | Nagashima | F16D 3/845 403/51 |
| 6,190,261 | B1 * | 2/2001 | Powell | F16D 3/843 464/170 |
| 6,966,838 | B2 * | 11/2005 | Herchenbach | F16D 3/841 464/175 |
| 7,758,433 | B2 * | 7/2010 | Yamauchi | F16D 3/843 464/178 |
| 9,915,294 | B2 * | 3/2018 | Littau | F16D 3/841 |
| 10,030,814 | B2 * | 7/2018 | Wei | F16D 3/84 |
| 10,107,380 | B2 * | 10/2018 | McGarry | F16D 3/843 |
| 10,309,466 | B2 * | 6/2019 | Littau | F16D 3/841 |
| 11,796,009 | B1 * | 10/2023 | Hunter | F16D 3/841 |
| 2005/0039940 | A1 * | 2/2005 | Egan | H02G 15/013 174/659 |
| 2007/0003173 | A1 * | 1/2007 | Schultz | F16D 3/841 384/276 |
| 2024/0196794 | A1 * | 6/2024 | Gupta | A01B 71/08 |

FOREIGN PATENT DOCUMENTS

| | | | | |
|---|---|---|---|---|
| FR | | 547444 A * | 12/1922 | F16D 3/84 |
| FR | | 591918 A * | 7/1925 | F16D 3/84 |
| WO | WO-2008126791 A1 * | | 10/2008 | F16D 3/841 |

* cited by examiner

COVER FOR A UNIVERSAL JOINT OF A DRIVESHAFT

CROSS REFERENCES AND PRIORITIES

This Application claims priority to International Application No. PCT/US2023/083960 filed on 14 Dec. 2023, U.S. application Ser. No. 18/482,328 filed on 6 Oct. 2023, U.S. application Ser. No. 18/174,728 filed on 27 Feb. 2023 (now granted as U.S. Pat. No. 11,796,009 on 24 Oct. 2023), and U.S. Provisional Patent Application No. 63/481,857 filed on 27 Jan. 2023, the teachings of each of which are incorporated by reference herein in their entirety.

BACKGROUND

Universal joints are used in drive trains of many vehicles to connect driveshafts (or segments thereof) to various other vehicle components such as an engine, transmission, or drive axle. The universal joints are flexible joints that permit the various vehicle components—including the driveshaft (or segment thereof)—to be positioned out of a straight-line alignment with one another. Universal joints (commonly referred to as "U-Joints") differ from constant-velocity joints (commonly referred to as "CV Joints") in that the universal joints typically come in a basic "cross" pattern and do not maintain a constant velocity at varying operational angles.

Many universal joints require lubrication and have grease fittings to accommodate such lubrication. As the drive shaft spins at high speed, the grease/oil in the universal joint is flung off the universal joint by the centrifugal force of the spinning universal joint. This grease/oil is deposited on portions of the vehicle—most notably the vehicle undercarriage—resulting in the need for repeated cleanings of the vehicle. A portion of the grease/oil is also typically deposited onto the road surface upon which the vehicle is driving which can result in damage to the road surface and/or environmental contamination and pollution.

Several solutions to prevent grease/oil from being flung off the universal joint and onto the vehicle have been proposed. The simplest of which is to dispose a flexible cover made of materials such as rubber or fabric around the portion of the vehicle driveshaft that includes the universal joint. One such solution is disclosed in United States Patent Publication No. 2009/0227383 which discloses a flexible, removable universal joint cover including a removable, reusable outer flexible shell and a removable, flexible liner.

In practice the existing solutions suffer from many defects. Most notably, the known solutions often attach to the driveshaft in a manner such that a portion of the cover comes into direct contact with the universal joint. The spinning universal joint may then damage the cover during use. This is particularly the case with covers of flexible materials such as rubber or fabric which may also be weakened or fatigued by the grease/oil flung from the universal joint as well as road debris such as rainwater, ice, rocksalt, and the like. Worse yet, the damage caused to the cover may result in full or partial loss of functionality of the universal joint as the damaged cover material may become lodged in the universal joint. In addition, many of the prior art solutions are designed as an uninterrupted cylinder which must be installed before connecting the driveshaft to other components, making repair or replacement of the cover difficult. This also limits or prevents access to the universal joint and its associated grease fitting which impedes the ability to service the universal joint.

The need exists, therefore, for a cover for a driveshaft universal joint which can withstand the harsh environments associated with the underside of a vehicle and which can be easily installed, repaired, and/or replaced.

SUMMARY

Described herein is a kit for a cover for a universal joint of a driveshaft. The kit includes a first section, a second section, a plurality of inserts, at least two cover fasteners, and at least one driveshaft fastener.

The first section has a first section first end, a first section second end opposite the first section first end, a first section first edge extending between a first section first end first end-point and a first section second end first end-point, a first section second edge extending between a first section first end second end-point and a first section second end second end-point, a first longitudinal axis, and a first radius.

The second section has a second section first end, a second section second end opposite the second section first end, a second section first edge extending between a second section first end first end-point and a second section second end first end-point, a second section second edge extending between a second section first end second end-point and a second section second end second end-point, a second longitudinal axis, and a second radius.

Each insert of the plurality of inserts has an insert sidewall having an inner surface and an outer surface, a third longitudinal axis, an inner diameter, and at least one sidewall longitudinal gap. Each insert of the plurality of inserts has a different inner diameter.

At least a first cover fastener of the at least two cover fasteners is configured to connect the first section first edge to the second section first edge; at least a second cover fastener of the at least two cover fasteners is configured to connect the first section second edge to the second section second edge. The at least one driveshaft fastener is configured to connect the cover to the driveshaft or to a yoke of the driveshaft without any portion of the cover contacting the universal joint.

In some embodiments, each insert of the plurality of inserts includes at least one inward protrusion extending from the inner surface of the insert sidewall.

In certain embodiments, the first section first edge may include a first groove. In such embodiments, the first section second edge may include a second groove. Further, in such embodiments, the second section first edge may include a third groove. Also, in such embodiments, the second section second edge may include a fourth groove. Each insert of the plurality of inserts may include at least a first outward protrusion extending from the outer surface of the insert sidewall, and a second outward protrusion extending from the outer surface of the insert sidewall. The first outward protrusion may be configured to nest between the first groove and the third groove when the first section is connected to the second section, and the second outward protrusion may be configured to nest between the second groove and the fourth groove when the first section is connected to the second section.

In some embodiments, the first section first edge may include a first section first flange, the second section first edge may include a second section first flange (125), and the first cover fastener may be configured to connect the first section first edge to the second section first edge by passing through the first section first flange and into the second section first flange or by passing through the second section first flange and into the first section first flange.

In certain embodiments, the first section second edge may include a first section second flange, the second section second edge may include a second section second flange, and the second cover fastener may be configured to connect the first section second edge to the second section second edge by passing through the first section second flange and into the second section second flange or by passing through the second section second flange and into the first section second flange.

In some embodiments, the first section may include a first step-down extending from a first position along a first length of the first section to the first section second end, and the second section may include a second step-down extending from a second position along a second length of the second section to the second section second end. In certain such embodiments, each insert of the plurality of inserts may be configured to nest between at least a portion of the first step-down and at least a portion of the second step-down.

In certain embodiments, when the at least one driveshaft fastener is configured to connect the cover to the yoke of the driveshaft, the first section second end may include at least one first radial flange, the second section second end may include at least one second radial flange, the at least one driveshaft fastener may include at least a first U-bolt and a second U-bolt (142), the first U-bolt may be configured to connect the at least one first radial flange to the yoke, and the second U-bolt may be configured to connect the at least one second radial flange to the yoke.

In some embodiments, the first section, the second section, and each insert of the plurality of inserts may each independently be composed of a semi-rigid polymeric material. In certain such embodiments, the semi-rigid polymeric material may be polypropylene or high density polyethylene.

In other embodiments, the first section, the second section, and each insert of the plurality of inserts may each independently be composed of a metal material selected from the group consisting of steel and aluminum.

In some embodiments, each cover fastener of the at least two cover fasteners may be a self-tapping screw.

Also disclosed herein is a kit for a cover for a universal joint of a driveshaft. The kit includes a first section, a second section, a plurality of pads, at least two cover fasteners, and at least one driveshaft fastener.

The first section has a first section first end, a first section second end opposite the first section first end, a first section first edge extending between a first section first end first end-point and a first section second end first end-point, a first section second edge extending between a first section first end second end-point and a first section second end second end-point, a first longitudinal axis, and a first radius.

The second section has a second section first end, a second section second end opposite the second section first end, a second section first edge extending between a second section first end first end-point and a second section second end first end-point, a second section second edge extending between a second section first end second end-point and a second section second end second end-point, a second longitudinal axis, and a second radius.

Each pad of the plurality of pads includes a pad sidewall having a pad inner surface and a pad outer surface, a pad attachment member located in the pad outer surface, and an inner arch diameter. At least two pads of the plurality of pads have a different inner arch diameter. The pad attachment member of each pad of the plurality of pads is configured to connect to a first attachment member of the at least one first attachment member and/or a second attachment member of the at least one second attachment member.

At least a first cover fastener of the at least two cover fasteners is configured to connect the first section first edge to the second section first edge; at least a second cover fastener of the at least two cover fasteners is configured to connect the first section second edge to the second section second edge. The at least one driveshaft fastener is configured to connect the cover to the driveshaft or to a yoke of the driveshaft without any portion of the cover contacting the universal joint.

In some embodiments, the first section first edge may include a first section first flange, the second section first edge may include a second section first flange (125), and the first cover fastener may be configured to connect the first section first edge to the second section first edge by passing through the first section first flange and into the second section first flange or by passing through the second section first flange and into the first section first flange.

In certain embodiments, the first section second edge may include a first section second flange, the second section second edge may include a second section second flange, and the second cover fastener may be configured to connect the first section second edge to the second section second edge by passing through the first section second flange and into the second section second flange or by passing through the second section second flange and into the first section second flange.

In some embodiments, the first section may include a first step-down extending from a first position along a first length of the first section to the first section second end, and the second section may include a second step-down extending from a second position along a second length of the second section to the second section second end. In certain such embodiments, each insert of the plurality of inserts may be configured to nest between at least a portion of the first step-down and at least a portion of the second step-down.

In certain embodiments, when the at least one driveshaft fastener is configured to connect the cover to the yoke of the driveshaft, the first section second end may include at least one first radial flange, the second section second end may include at least one second radial flange, the at least one driveshaft fastener may include at least a first U-bolt and a second U-bolt (142), the first U-bolt may be configured to connect the at least one first radial flange to the yoke, and the second U-bolt may be configured to connect the at least one second radial flange to the yoke.

In some embodiments, the first section, the second section, and each pad of the plurality of pads may each independently be composed of a semi-rigid polymeric material.

DETAILED DESCRIPTION

Disclosed herein is a cover for a universal joint of a driveshaft. The cover is described below with reference to the Figures. As described herein and in the claims, the following numbers refer to the following structures as noted in the Figures.

5 refers to a driveshaft.
10 refers to a universal joint.
12 refers to a double cardan universal joint.
20 refers to a yoke.
22 refers to a yoke of a double cardan universal joint.
100 revers to a cover.
110 refers to a first section.
111 refers to a first section first end.
112 refers to a first section second end.
113 refers to a first section first edge.
114 refers to a first section second edge.
115 refers to a first section first flange.
116 refers to a first section second flange.
117 refers to a first step-down.
118 refers to a first radial flange.
119 refers to a pair of first tabs.
120 refers to a second section.
121 refers to a second section first end.
122 refers to a second section second end.
123 refers to a second section first edge.
124 refers to a second section second edge.
125 refers to a second section first flange.
126 refers to a second section second flange.
127 refers to a second step-down.
128 refers to a second radial flange.
129 refers to a pair of second tabs.
130 refers to a cover fastener.
140 refers to a driveshaft fastener.
141 refers to a first U-bolt.
142 refers to a second U-bolt.
150 refers to a third section.
171 refers to a first groove.
172 refers to a second groove.
173 refers to a third groove.
174 refers to a fourth groove.
200 refers to an insert.
210 refers to an insert sidewall.
211 refers to an inner surface (of an insert sidewall).
212 refers to an outer surface (of an insert sidewall).
213 refers to a sidewall longitudinal gap.
220 refers to an inward protrusion.
231 refers to a first outward protrusion.
232 refers to a second outward protrusion.
300 refers to a pad.
310 refers to a pad sidewall.
311 refers to a pad inner surface.
312 refers to a pad outer surface.
320 refers to a pad attachment member.
410 refers to a first attachment member.
420 refers to a second attachment member.
$\alpha_1$ refers to a first longitudinal axis.
$r_1$ refers to a first radius.
$\alpha_2$ refers to a second longitudinal axis.
$r_2$ refers to a second radius.
$\alpha_3$ refers to a third longitudinal axis.
$d_1$ refers to an inner diameter.
$d_2$ refers to an inner arch diameter.

Figure 1:
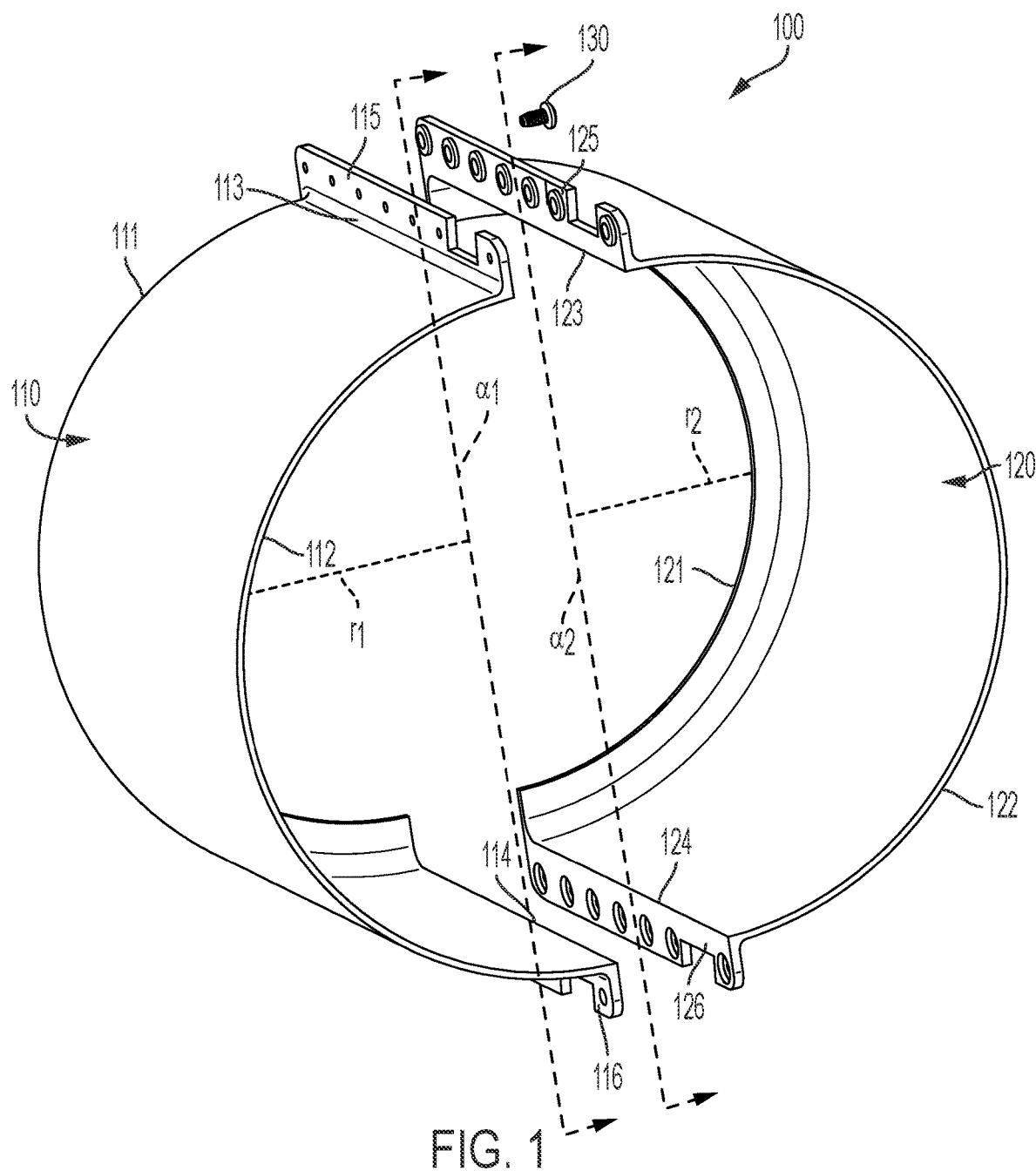
FIG. 1 is an exploded perspective view of one embodiment of a cover for a universal joint of a driveshaft.
Figure 2:
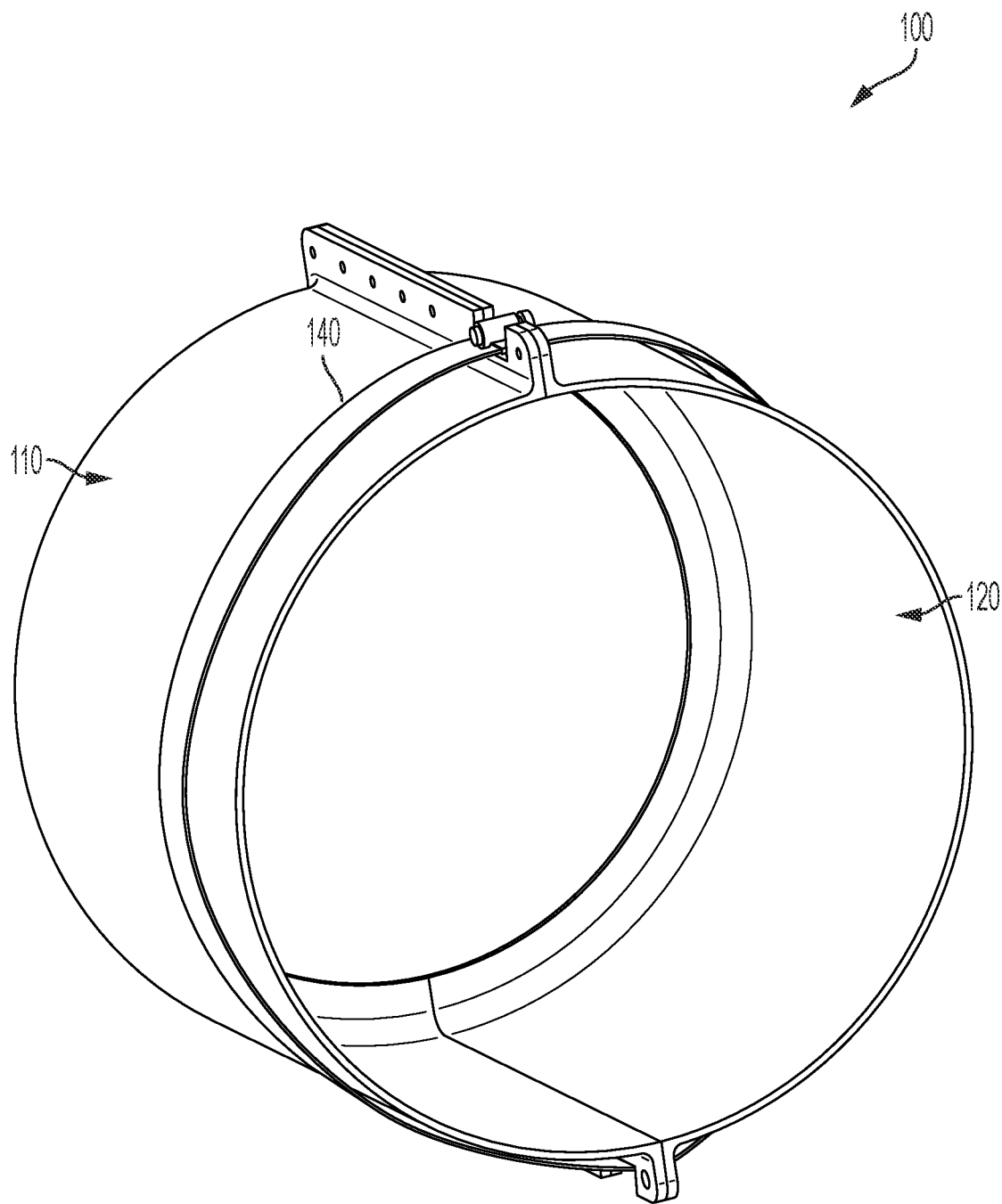
FIG. 2 is an assembled perspective view of the embodiment of a cover of FIG. 1.
Figure 5:
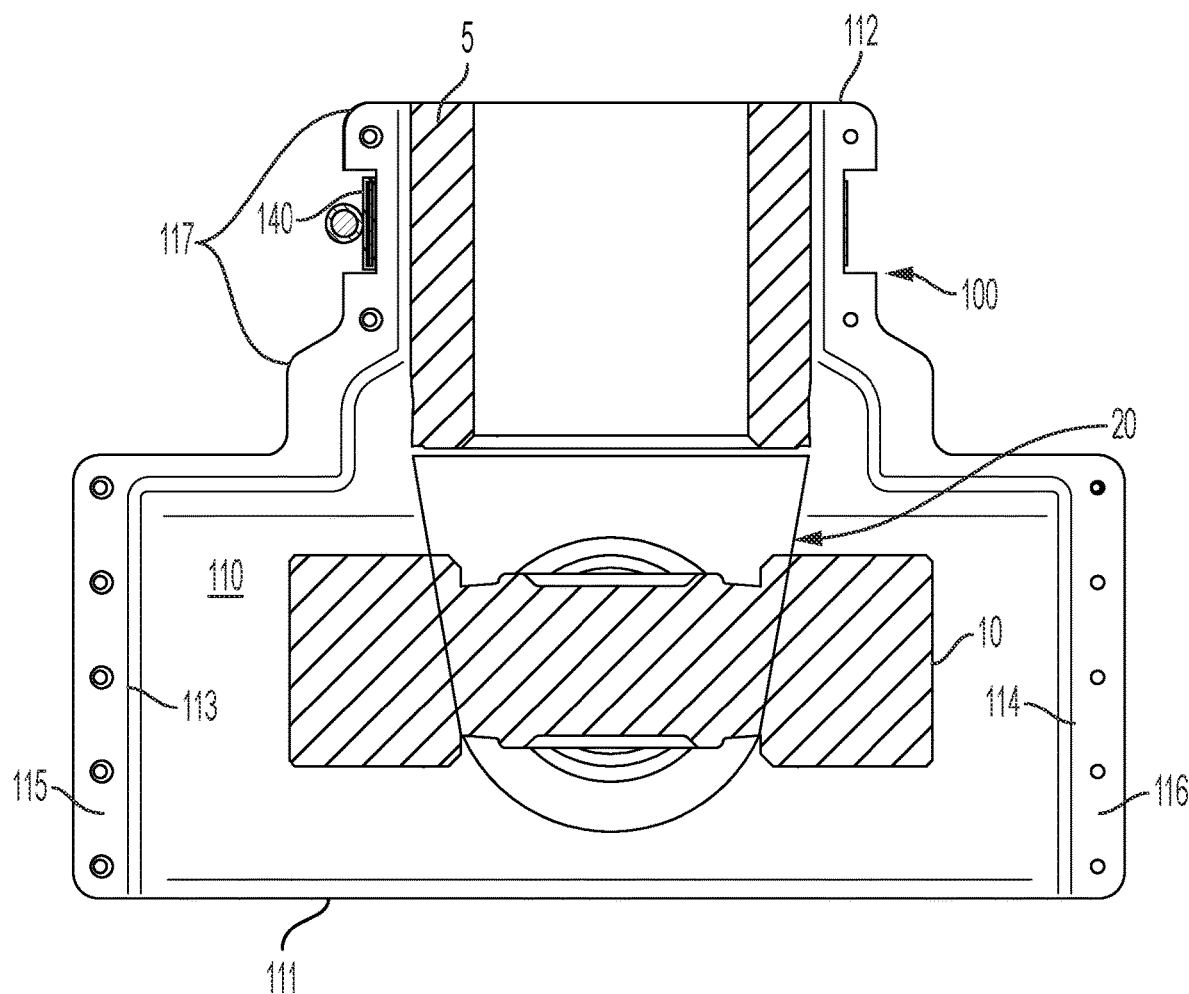
FIG. 5 is a longitudinal cross-sectional view of the embodiment of a cover of FIGS. 3 and 4 connected to a driveshaft.

FIG. 1 and FIG. 2 show one embodiment of a cover (100) for a universal joint (10 as shown in FIG. 5) of a driveshaft (5 as shown in FIG. 5) with FIG. 1 being an exploded perspective view and FIG. 2 being an assembled perspective view. As shown in FIG. 1 and FIG. 2, the cover is divided into at least two sections referred to herein as a first section (110) and a second section (120). When assembled, the first section and the second section (and optional further sections) form the cover which has a substantially cylindrical profile as shown in FIG. 2. As the assembled cover has a substantially cylindrical profile, each of the sections (including at least the first section and the second section) have a substantially semi-cylindrical profile as shown in FIG. 1.

FIG. 1 shows the first section (110) having a first section first end (111) and a first section second end (112) opposite the first section first end. A first section first edge (113) extends between first end-points of the first section first end and the first section second end. Similarly, a first section second edge (114) extends between second end-points of the first section first end and the first section second end. As the first section has a substantially semi-cylindrical profile, the first section will have a first longitudinal axis ($\alpha_1$) and a first radius ($r_1$) as shown in FIG. 1. Further, the substantially semi-cylindrical profile of the first section provides for the first section first end and the first section second end forming an arch in a range of between about 30° and about 330°, preferably in a range of between about 90° and about 270°, and more preferably in a range of between about 135° and 225°. In the embodiment shown in FIG. 1 the first section first end and the first section second end form an arch of about 180°.

The second section (120) may be similar in construction to the first section (110) as shown in FIG. 1. That is to say that the second section has a second section first end (121) and a second section second end (122) opposite the second section first end. A second section first edge (123) extends between first end-points of the second section first end and the second section second end. Similarly, a second section second edge (124) extends between second end-points of the second section first end and the second section second end. As the second section has a substantially semi-cylindrical profile, the second section will have a second longitudinal axis ($\alpha_2$) and a second radius ($r_2$) as shown in FIG. 1. Further, the substantially semi-cylindrical profile of the second section provides for the second section first end and the second section second end forming an arch in a range of between about 30° and about 330°, preferably in a range of between about 90° and about 270°, and more preferably in a range of between about 135° and 225°. In the embodiment shown in FIG. 1 the second section first end and the second section second end form an arch of about 180°.

While the Figures show a cover (100) comprising two sections, embodiments may exist having more than two sections. Each additional section—when present—may have its own independent additional section first end and additional section second end opposite the additional section first end. Each additional section—when present—may also have its own independent additional section first edge extending between first end-points of the additional section first end and the additional section second end, and additional section second edge extending between second end-points of the additional section first end and the additional section second end. As each additional section has a substantially semi-cylindrical profile, each additional section will have an additional section longitudinal axis and an additional section first radius. Further, the substantially semi-cylindrical profile of each additional section provides for each additional section first end and each additional section second end forming an arch in a range of between about 30° and about 300°, preferably in a range of between about 90° and about 240°, and more preferably in a range of between about 135° and 195°.

Regardless of the number of sections, the sum of the arches of all the section's first ends will equal 360°. Similarly, the sum of the arches of all the section's second ends will also equal 360°. As such, the sections may be attached to one another in such a way as to form a single cover (100) having a substantially cylindrical profile.

FIG. 1 also shows the cover comprising cover fasteners (130). At least a first cover fastener will be configured to connect the first section first edge (113) to the second section first edge (123). Similarly, at least a second cover fastener will be configured to connect the first section second edge (114) to the second section second edge (124). The preferred cover fastener is a self-tapping screw. Alternatively, other types of cover fastener may be utilized including screws, bolts (with or without nuts), rivets, clips, clamps, and the like.

Further shown in FIG. 2 is at least one driveshaft fastener (140). The at least one driveshaft fastener will be configured to connect the cover (100) to the driveshaft (5 as shown in FIG. 5) and/or a yoke (20 as shown in FIG. 5) of the driveshaft. Examples of a driveshaft fastener include clamps (such as worm gear clamps, spring clamps, wire clamps, ear clamps, and the like), screws, bolts, rivets, and the like. When connected to the driveshaft or yoke, no portion of the cover contacts the universal joint (10 as shown in FIG. 5).

FIG. 1 further shows the first section first edge (113) comprising a first section first flange (115), and the second section first edge (123) comprising a second section first flange (125). The first section first flange is located along at least a portion—and in some embodiments all—of the first section first edge and is aligned substantially parallel with the first longitudinal axis ($\alpha_1$). Similarly, the second section first flange is located along at least a portion—and in some embodiments all—of the second section first edge and is aligned substantially parallel with the second longitudinal axis ($\alpha_2$). Each of the first section first flange and the second section first flange are considered optional features and may not be present in certain embodiments. When the flanges are present, the at least one first cover fastener is configured to connect the first section first edge to the second section first edge by passing through the first section first flange and into the second section first flange—or by passing through the second section first flange and into the first section first flange. As such, one or both of the first section first flange and/or the second section first flange may comprise a hole passing through the respective flange through which the at least one first cover fastener may pass.

FIG. 1 further shows the first section second edge (114) comprising a first section second flange (116), and the second section second edge (124) comprising a second section second flange (126). The first section second flange is located along at least a portion—and in some embodiments all—of the first section second edge and is aligned substantially parallel with the first longitudinal axis ($\alpha_1$). Similarly, the second section second flange is located along at least a portion—and in some embodiments all—of the second section second edge and is aligned substantially parallel with the second longitudinal axis ($\alpha_2$). Each of the first section second flange and the second section second flange are considered optional features and may not be present in certain embodiments. When the flanges are present, the at least one second cover fastener is configured to connect the first section second edge to the second section second edge by passing through the first section second flange and into the second section second flange—or by passing through the second section first flange and into the first section second flange. As such, one or both of the first section second flange and/or the second section first flange may comprise a hole passing through the respective flange through which the at least one second cover fastener may pass.

Figure 3:
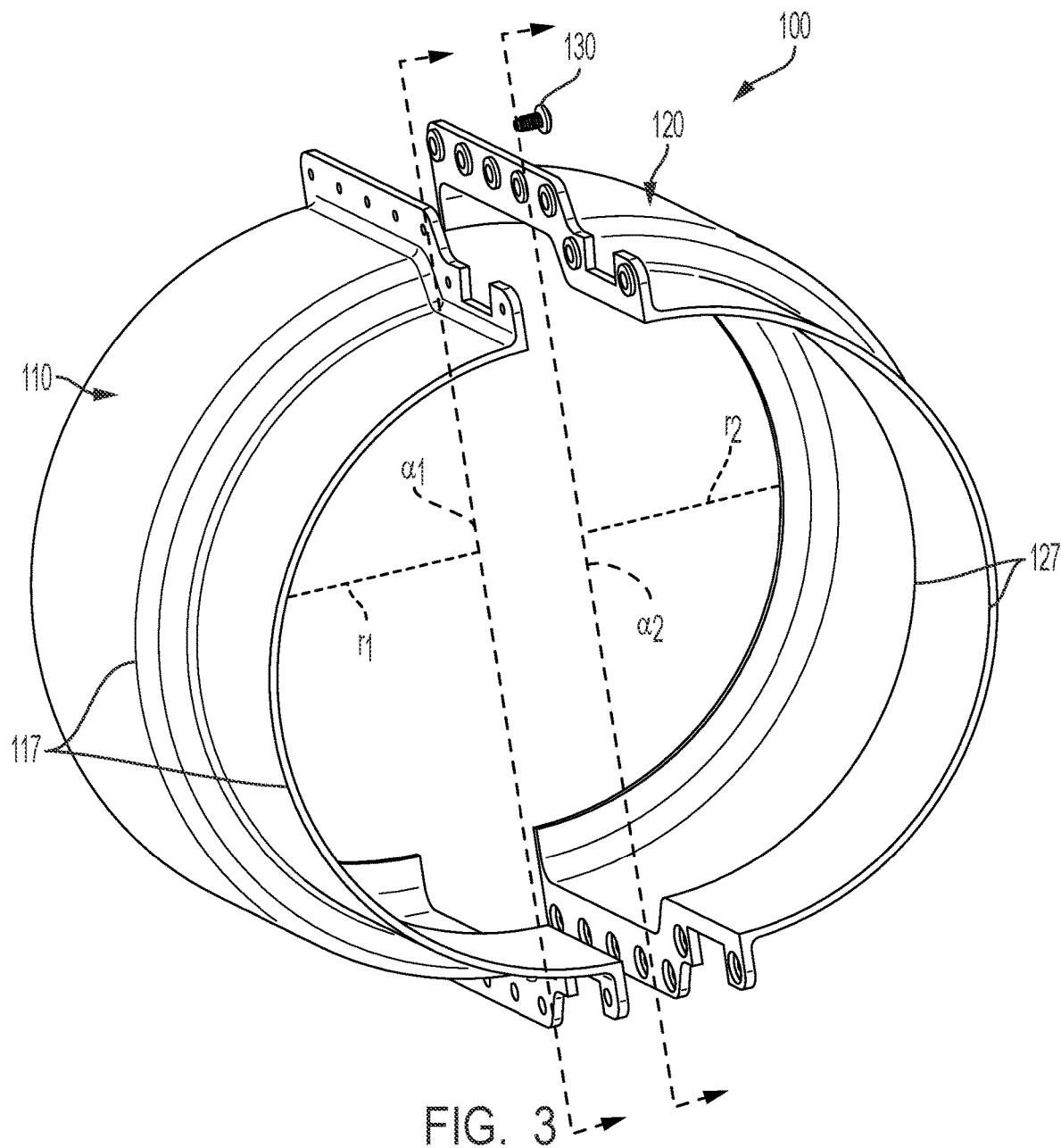
FIG. 3 is an exploded perspective view of one embodiment of a cover for a universal joint of a driveshaft.
Figure 4:
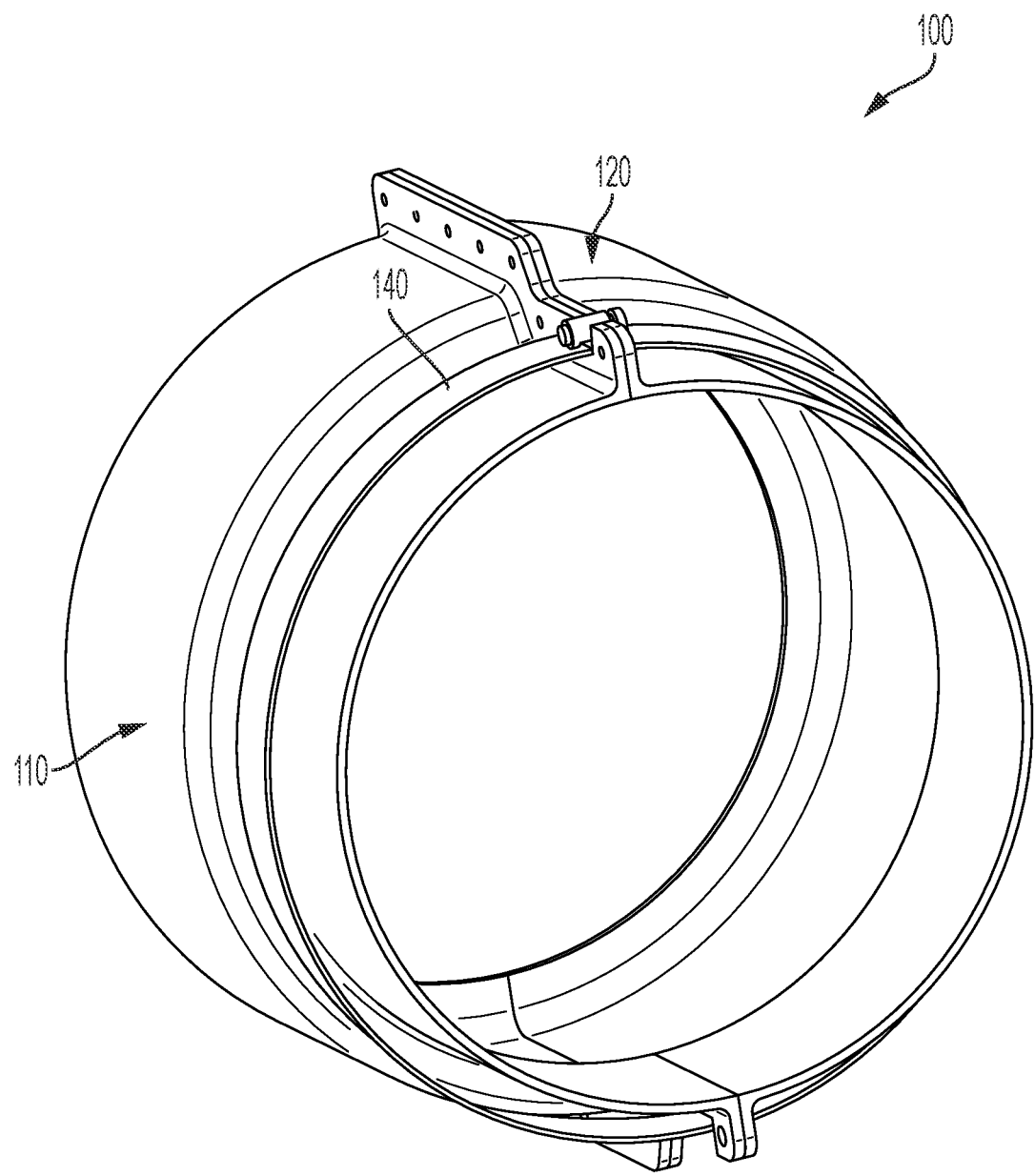
FIG. 4 is an assembled perspective view of the embodiment of a cover of FIG. 3.

FIG. 3 through FIG. 5 show embodiments of the cover (100) which include a step-down portion. As shown in FIG. 3, which is an exploded perspective view of an embodiment which includes a step-down portion, the first section (110) comprises a first step-down (117) extending from a first position along a first length of the first section to the first section second end (112). This first step-down may be considered as a third radius of the first section which is less than the first radius ($r_1$).

Similarly, the second section (120) may comprise a second step-down (127) extending from a second position along a second length of the second section to the second section second end (122) as shown in FIG. 3. This second step-down may be considered as a fourth radius of the second section which is less than the second radius ($r_2$) Preferably the fourth radius of the second section will be substantially similar or identical in dimension to the third radius of the first section.

In embodiments where the cover (100) comprises additional sections, each additional section may also include a step-down. When present, the step-down in each additional section will extend from a position along a length of the additional section to the additional section's second end. The additional section step-down may be considered as an additional section second radius which is less than the additional section radius. Preferably each additional section second radius will be substantially similar or identical in dimension to one (preferably both) of the third radius of the first section and/or the fourth radius of the second section.

When assembled—as shown in FIG. 4—the sections, including their step-downs, form the cover (100) with the cover having a first cover radius proximate to the first end, and a second cover radius proximate to the second end with the dimension of the second cover radius being less than that of the first cover radius.

FIG. 5 shows a longitudinal cross-section view of an embodiment of the cover (100) with a step-down portion connected to a driveshaft (5) or a slip joint of a driveshaft which includes a universal joint (10) and a yoke (20). While the embodiment in FIG. 5 is labelled with numbering corresponding to the first section (110), the structure and configuration applies equally to the second section.

As shown in FIG. 5, a portion of cover (100) which is in the step-down area may be configured to contact the driveshaft (5) when the at least one driveshaft fastener (140) connects the cover to the driveshaft. No portion of the cover contacts the universal joint as shown in FIG. 5.

Figure 6:
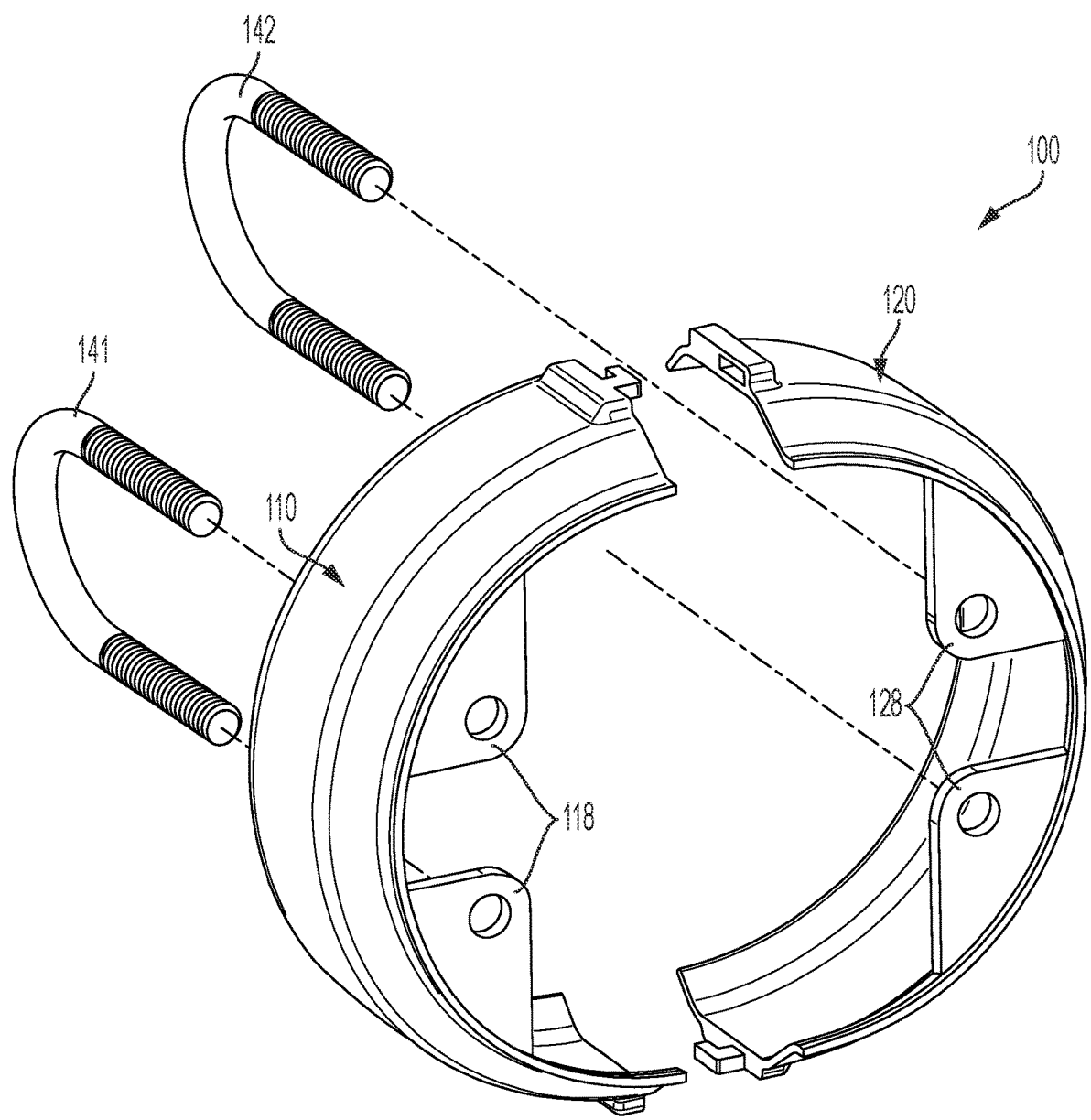
FIG. 6 is an exploded perspective view of one embodiment of a cover for a universal joint of a driveshaft.
Figure 7:
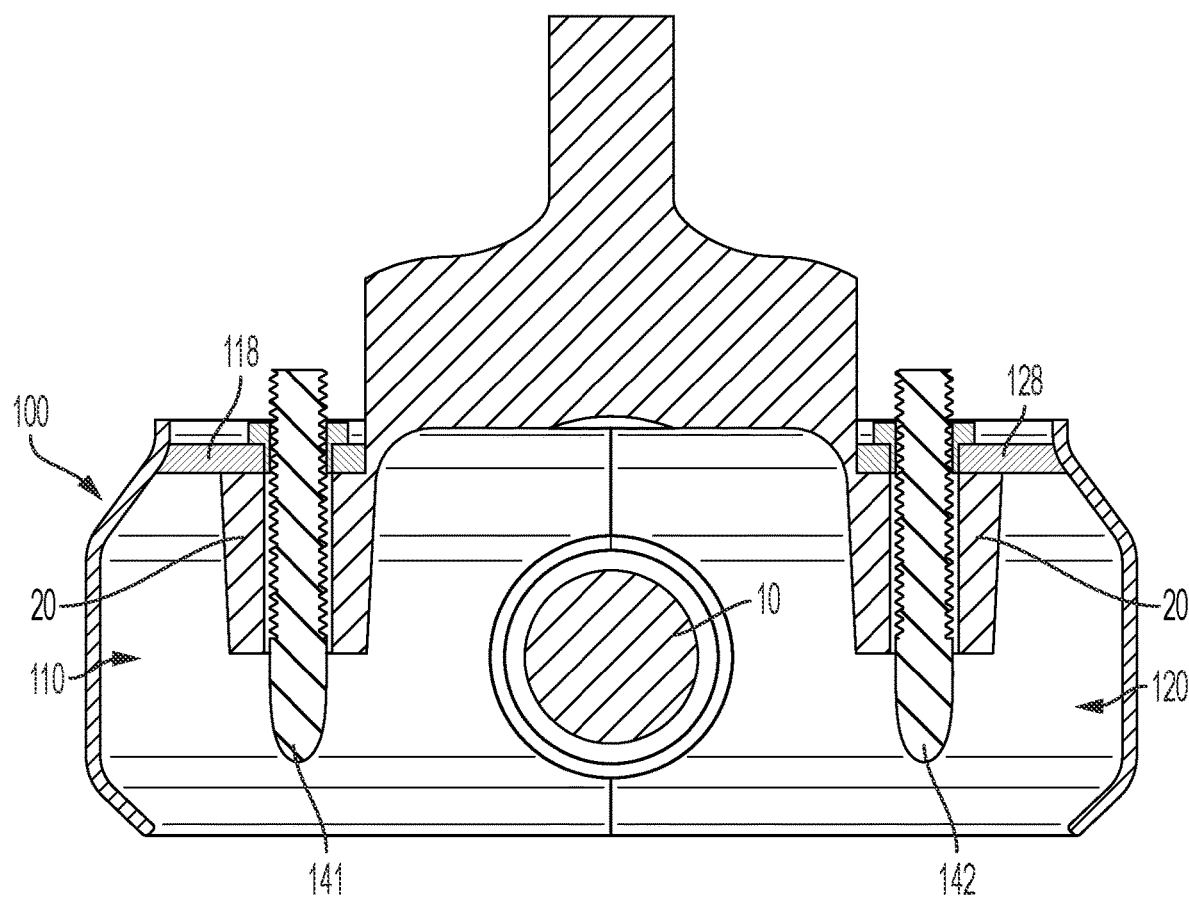
FIG. 7 is a longitudinal cross-sectional view of the embodiment of a cover of FIG. 4 connected to a yoke of a driveshaft.

FIG. 6 and FIG. 7 show embodiments of the cover (100) comprising radial flanges for connecting to yoke U-bolts. As shown in FIG. 6, which is an exploded perspective view of an embodiment which includes radial flanges, the first section second end (112 as shown in FIG. 1) comprises at least one first radial flange (118). In preferred embodiments, the first section second end will comprise two first radial flanges as shown in FIG. 6 and FIG. 7. The first radial flange(s) may extend inwardly from the first section second end along all or a portion of the arch of the first section second end. One or more first radial flange hole(s) which are configured in size, shape, and location to receive a first U-bolt (141) which connects the yoke (20) to the universal joint (10) may pass through each first radial flange.

Similarly, the second section second end (122 as shown in FIG. 1) comprises at least one second radial flange (128) as shown in the embodiment shown in FIG. 6. In preferred embodiments, the second section second end will comprise two second radial flanges as shown in FIG. 6 and FIG. 7. The second radial flange(s) may extend inwardly from the second section second end along all or a portion of the arch of the second section second end. One or more second radial flange hole(s) which are configured in size, shape, and location to receive a second U-bolt (142) which connects the yoke (20) to the universal joint (10) may pass through each second radial flange.

The embodiment shown in FIG. 6 and FIG. 7 also shows an alternative embodiment for connecting the first section (110) to the second section (120). In this embodiment, a tongue and groove connection connects the first section to the second section. A tongue being disposed on at least one end-point of one of either the first section or the second section. The opposing end-point on the other section having a groove configured to securely receive the tongue. For instance, when the second end-point of the second section comprises a tongue (as shown in FIG. 6), the second end-point of the first section will comprise a groove configured to securely receive the tongue.

In embodiments where the cover (100) comprises additional sections, one or more of the additional section(s) may comprise at least one additional section radial flange. Each additional section radial flange may extend inwardly from the additional section second end along all or a portion of the arch of the additional section second end. One or more additional section radial flange hole(s) which are configured in size shape, and location to receive a U-bolt which connects the yoke (20) to the universal joint (10) may pass through each additional section radial flange. One or more of the additional section(s) may also include a tongue and groove connection for connecting the additional section(s) to one another and/or to the first section (110) and/or the second section (120).

FIG. 7 shows a longitudinal cross-section view of an embodiment of the cover (100) that includes radial flanges for connecting to driveshaft U-bolts. While the embodiment in FIG. 7 is labelled with numbering corresponding to the first section (110), the structure and configuration applies equally to the second section.

As shown in FIG. 7, the at least one driveshaft fastener comprises at least a first U-bolt (141) and a second U-bolt (142 as shown in FIG. 6). These driveshaft fasteners are configured to connect the cover (100) to the yoke (20) of the driveshaft (5). The first U-bolt is configured to connect the first section (110) to the yoke by passing the first U-bolt through hole(s) in the first radial flange (118). The second U-bolt is configured to connect the second section (120) to the yoke by passing the second U-bolt through hole(s) in the second radial flange (128). As the radial flanges of the cover contact the yoke, no portion of the cover contacts the universal joint as shown in FIG. 7.

Figure 8:
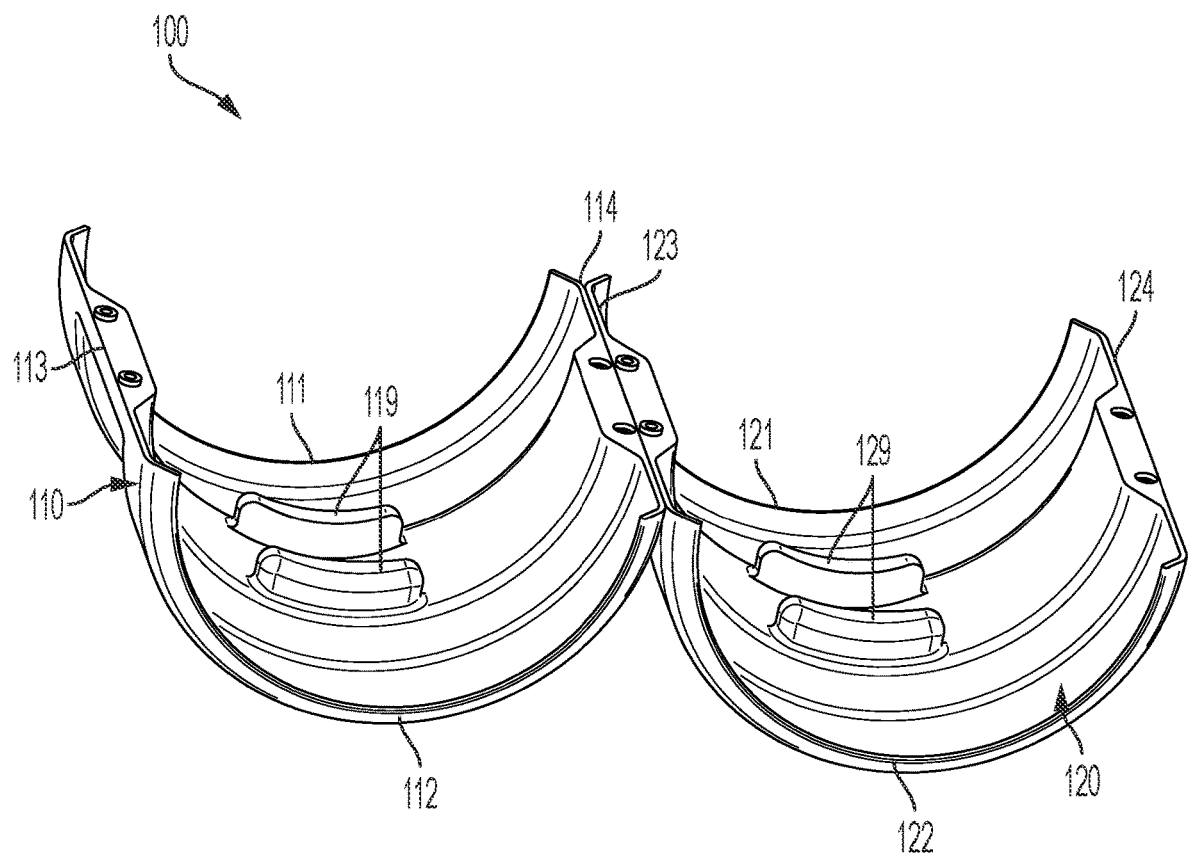
FIG. 8 is an interior view of two sections of an embodiment of a cover for a universal joint of a driveshaft.
Figure 9:
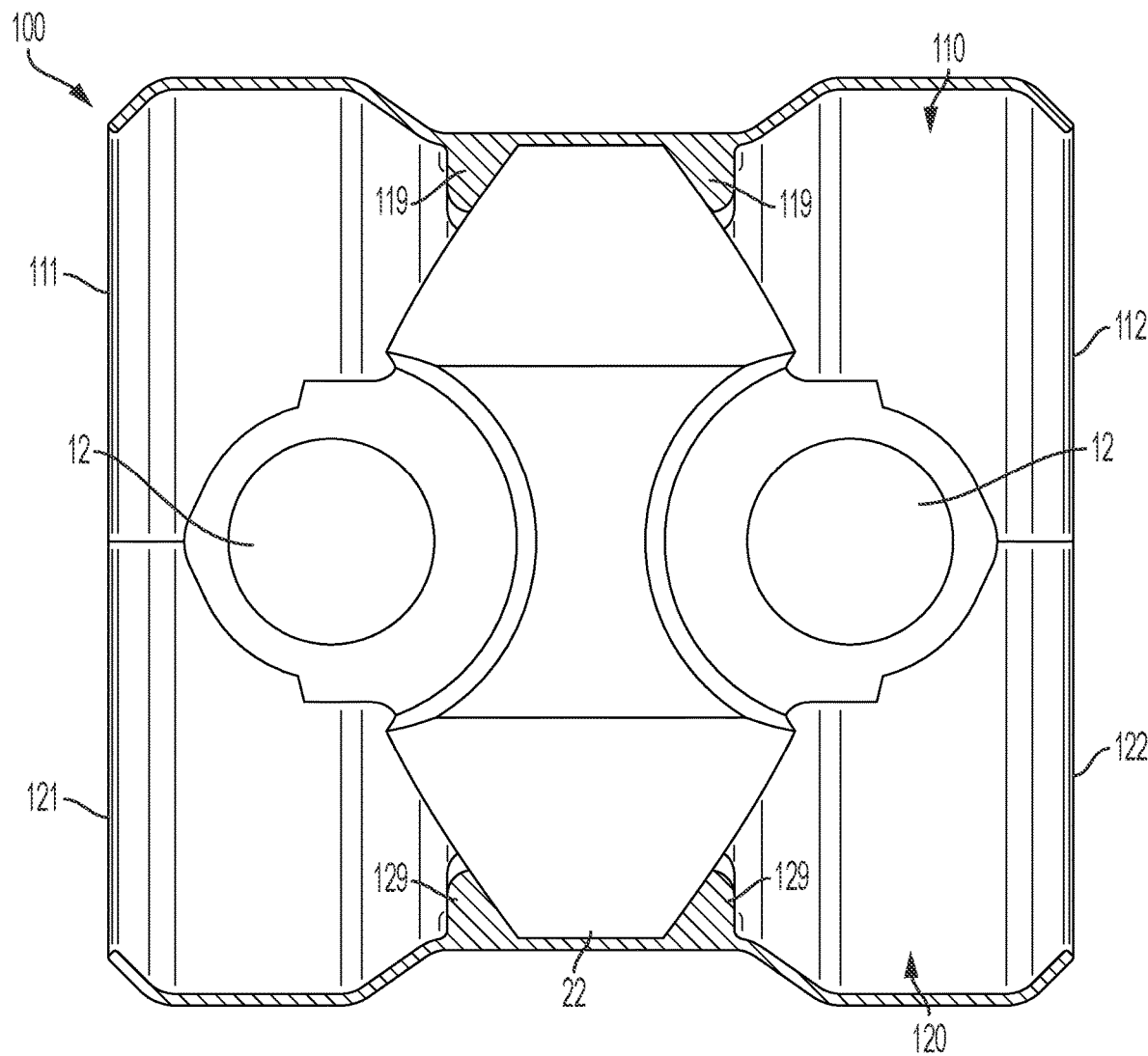
FIG. 9 is a longitudinal cross-sectional view of the embodiment of a cover of FIG. 8 connected to a driveshaft having a double cardan universal joint.

FIGS. 8 and 9 show an alternative embodiment of a cover (100) which is specifically adapted for use with a double cardan universal joint (12 as shown in FIG. 9). FIG. 8 is an exploded and partially unwrapped view of the cover. As shown in FIG. 8, the first section (110) may comprise a pair of first tabs (119). Each first tab of the pair of first tabs extends inwardly from an interior wall of the first section.

Similarly, FIG. 8 shows the second section (120) which may comprise a pair of second tabs (129). Each second tab of the pair of second tabs extends inwardly from an interior wall of the second section. Each of the pair of first tabs and the pair of second tabs is configured to engage a yoke of a double cardan universal joint (22) as shown in FIG. 9.

Figure 10:
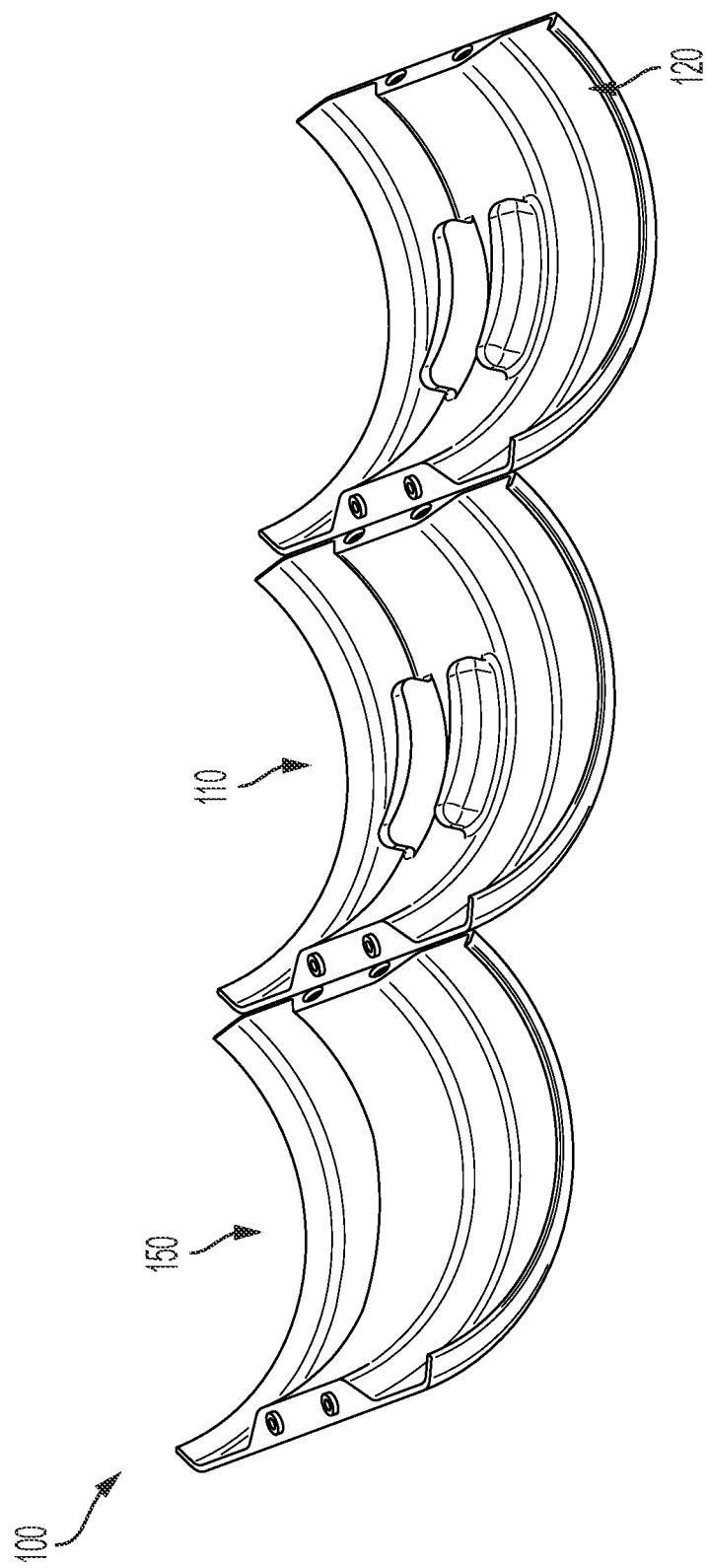
FIG. 10 is an interior view of three sections of an embodiment of a cover for a universal joint of a driveshaft.

In embodiments where the cover (100) comprises additional sections (150), as shown in FIG. 10, one or more of the additional section(s) may comprise a pair of additional section tabs. Each pair of additional section tabs may extend inwardly from an interior wall of the additional section. Each pair of additional tabs may be configured to engage a yoke of a double cardan universal joint (22).

Figure 11:
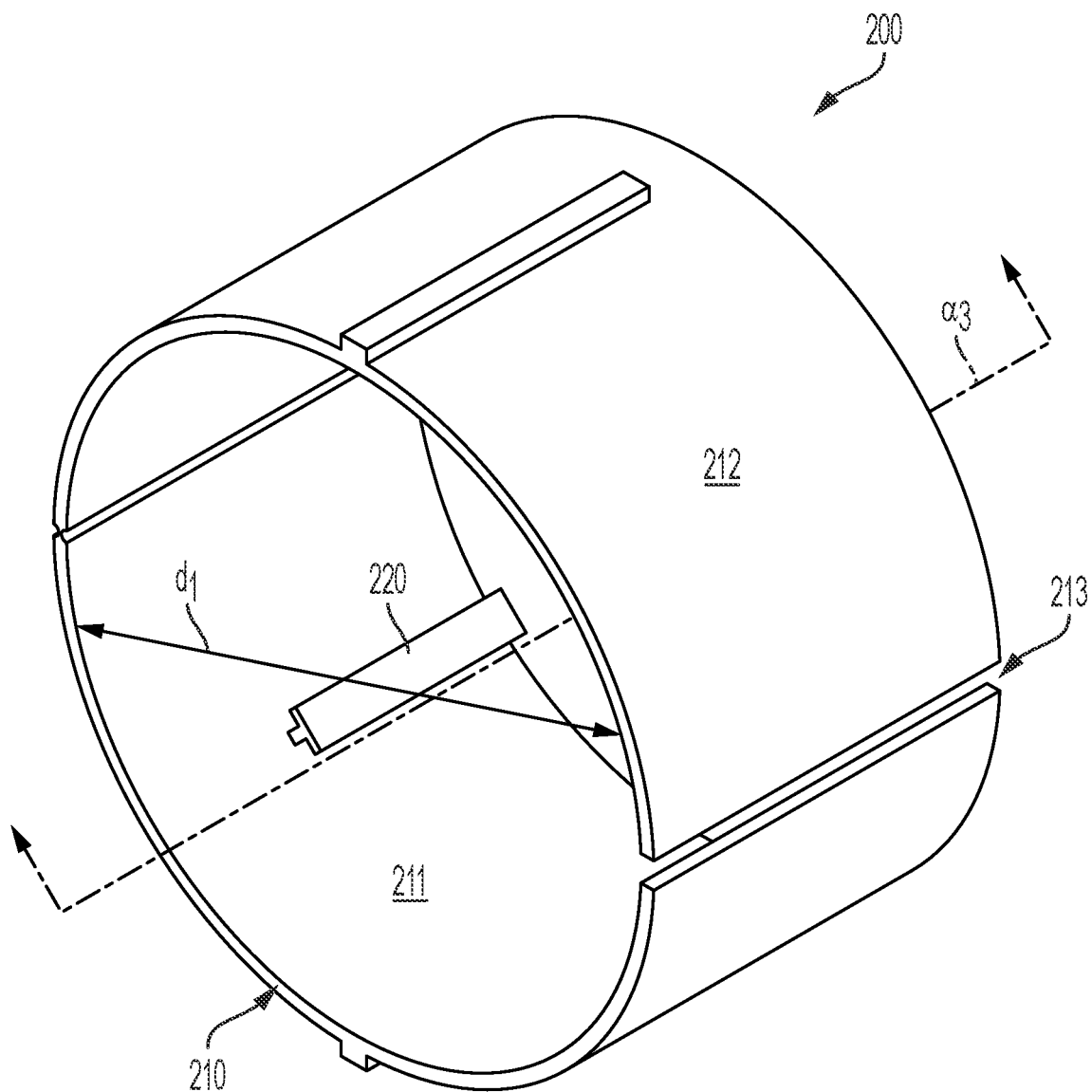
FIG. 11 is a perspective view of an insert for a cover for a universal joint of a driveshaft.
Figure 15:
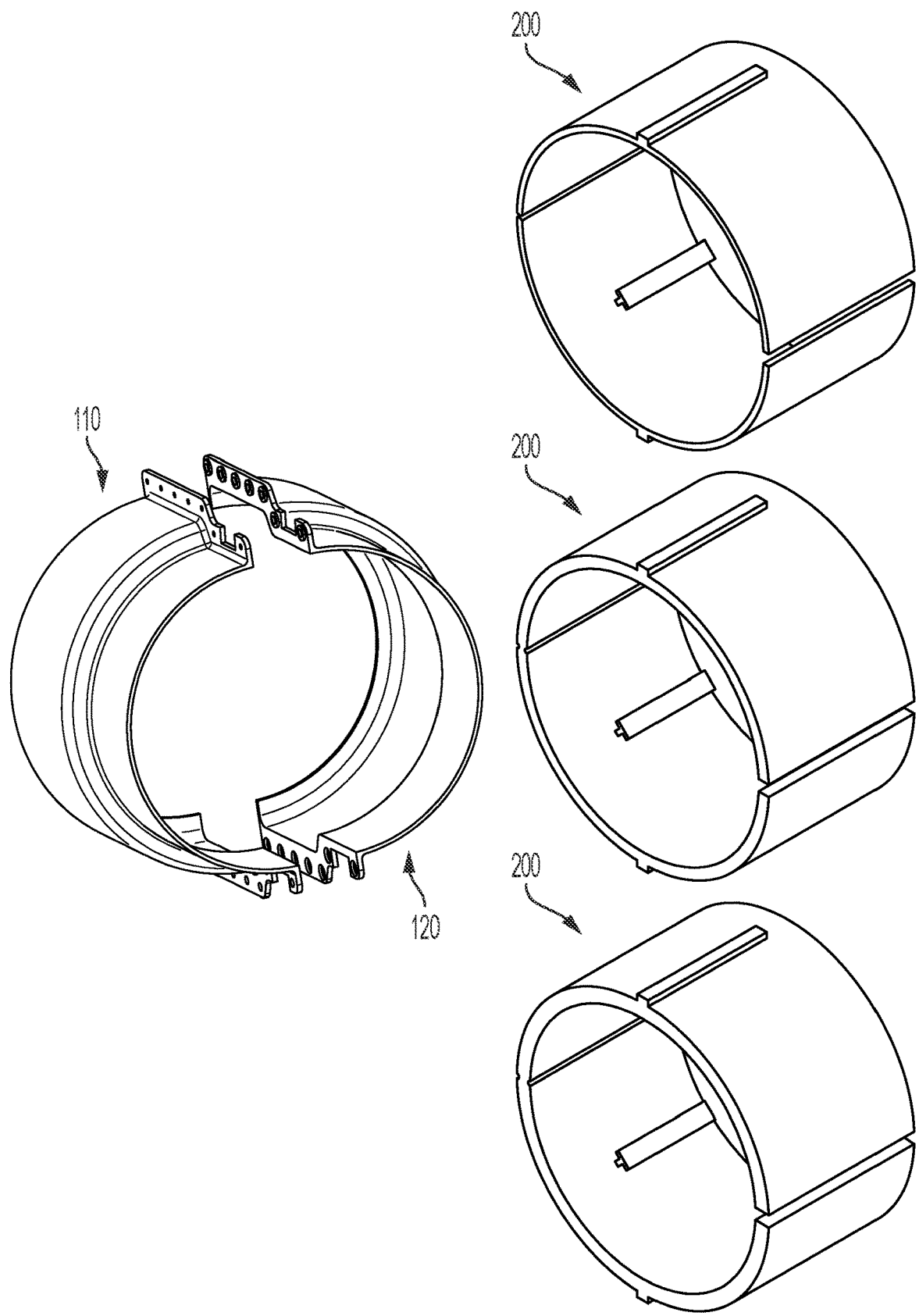
FIG. 15 is a perspective view of an embodiment of a cover kit for a universal joint of a driveshaft.

FIG. 11 illustrates an insert (200) which may be used with any of the covers disclosed herein to allow the cover to adapt to driveshafts of varying diameters without changing the size or shape of the cover itself. In some embodiments, the cover may be in the form of a kit (an embodiment of which is shown in FIG. 15) comprising at least a first cover section (110) and a second cover section (120), at least two cover fasteners (130), at least one driveshaft fastener (140), and a plurality of inserts. Preferably, each insert of the plurality of inserts in the kit will have a different inner diameter ($d_i$).

Each insert (200)—when present—has an insert sidewall (210) having an inner surface (211) and an outer surface (212). Preferably, the insert will have a substantially cylindrical profile as shown in FIG. 11 with a third longitudinal axis ($\alpha_3$) and an inner diameter ($d_i$). Preferably at least one sidewall longitudinal gap (213) will pass through the insert sidewall from the outer surface through the inner surface spanning the entire length of the insert sidewall and allowing the insert to be placed around at least a portion of a universal joint and a driveshaft without having to remove the driveshaft assembly.

Figure 14:
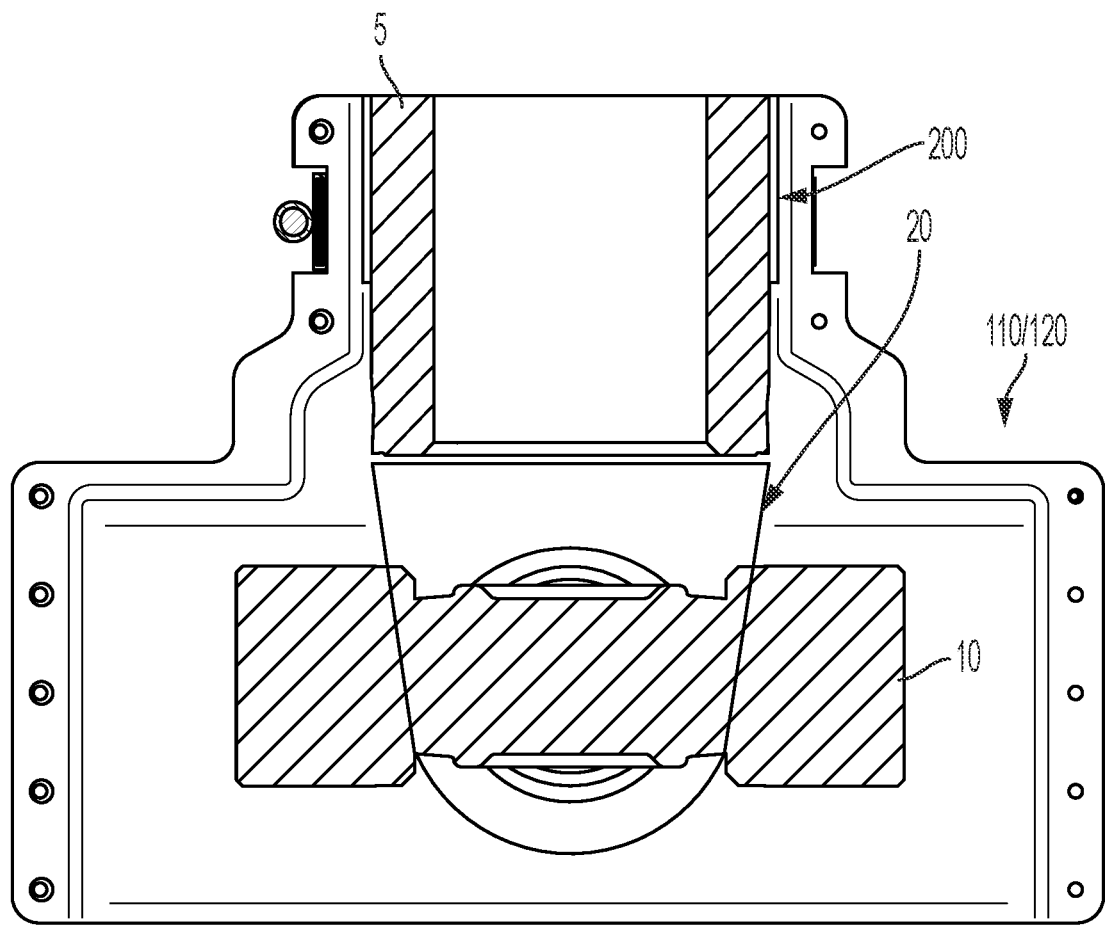
FIG. 14 is an axial cross-section view of a cover for a universal joint of a driveshaft with an insert connected to a driveshaft.

In some embodiments, the insert (200) may further include one or more surface features at the inner surface of the insert sidewall configured to adapt to a portion of the driveshaft and/or the yoke as shown in FIG. 14. One such surface feature is shown in FIG. 11 which illustrates an inward protrusion (220). Nonlimiting examples of other surface features include indentation(s), groove(s), blind hole (s), slot(s), and the like.

Figure 12:
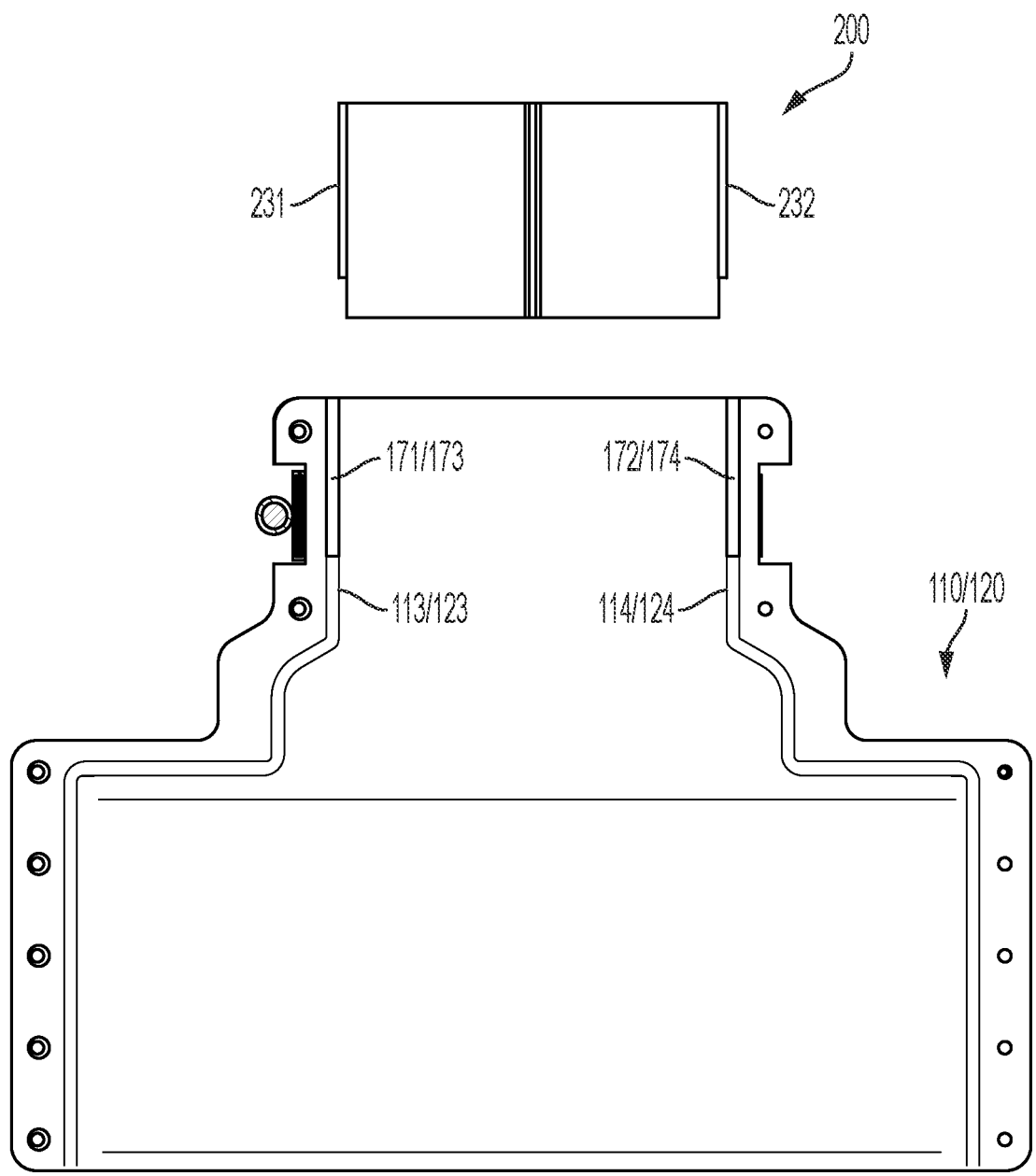
FIG. 12 is an exploded side view of an insert with a portion of a cover for a universal joint of a driveshaft.
Figure 13:
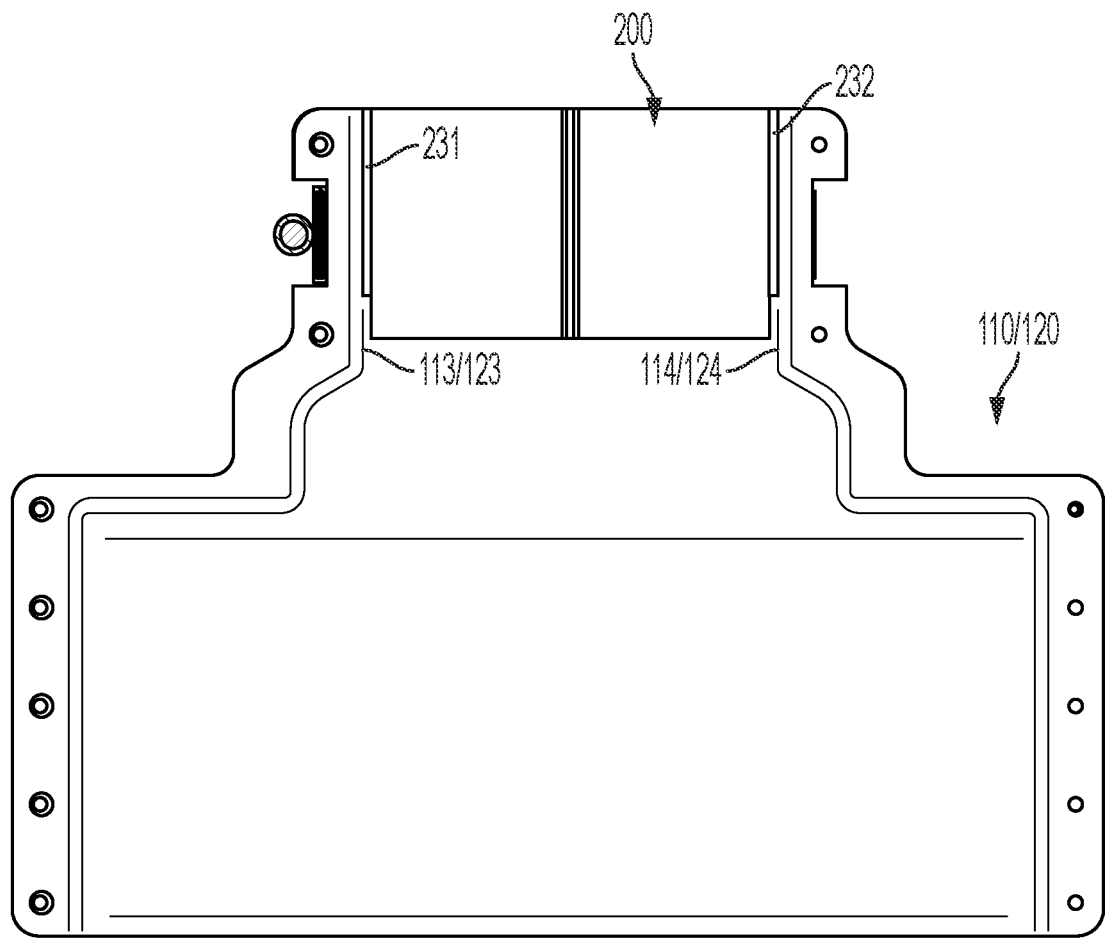
FIG. 13 is an assembled view of FIG. 12.

FIG. 12 and FIG. 13 illustrate exploded side (FIG. 12) and assembled side (FIG. 13) views of a cover section (which may be the first section (110) or the second section (120)) and an insert (200). As shown in FIG. 12 and FIG. 13, in some embodiments, the first section first edge (113) may include a first groove (171), the first section second edge (114) may include a second groove (172), the second section first edge (123) may include a third groove (173), and the second section second edge (124) may include a fourth groove (174). In such embodiments, the insert(s) may include at least a first outward protrusion (231) and a second outward protrusion (232) with the first outward protrusion extending from the outer surface (212) of the insert sidewall (210) and the second outward protrusion extending from a second position on the outer surface of the insert sidewall as shown in FIG. 12. When the cover is assembled, the first outward protrusion is configured to nest between the first groove and the third groove while the second outward protrusion is configured to nest between the second groove and the fourth groove.

Figure 16:
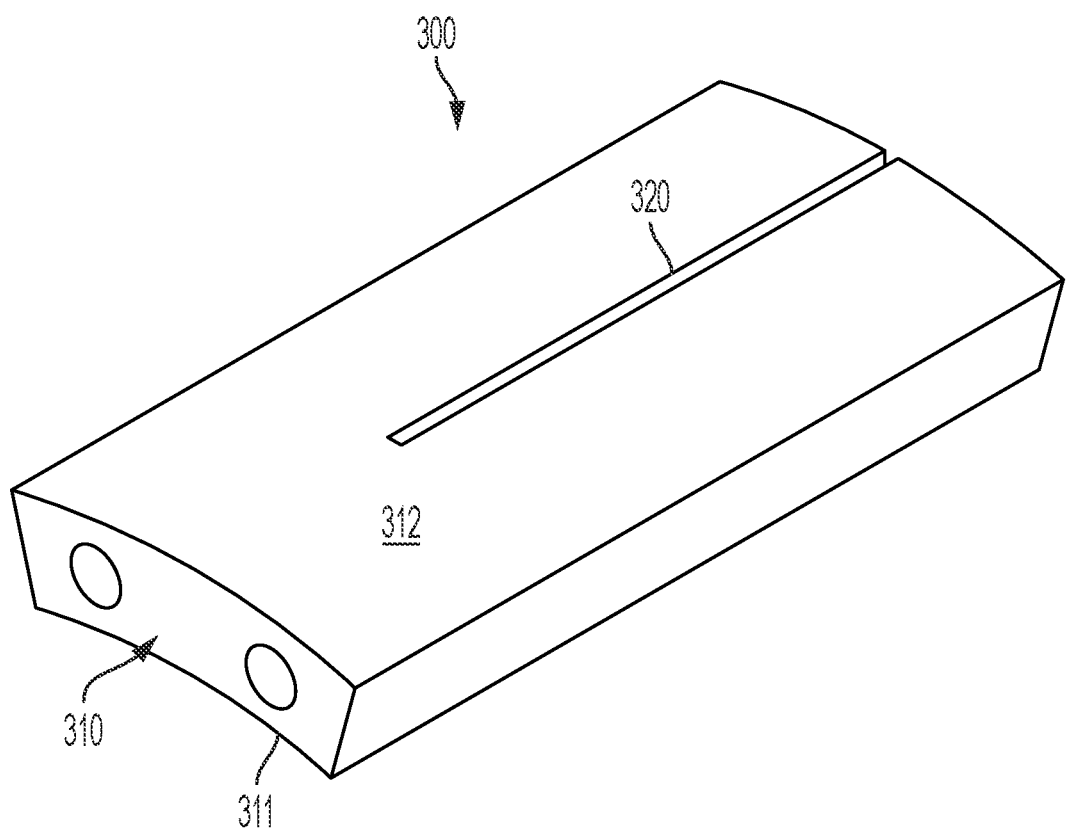
FIG. 16 is a perspective view of a pad for a cover for a universal joint of a driveshaft.
Figure 19:
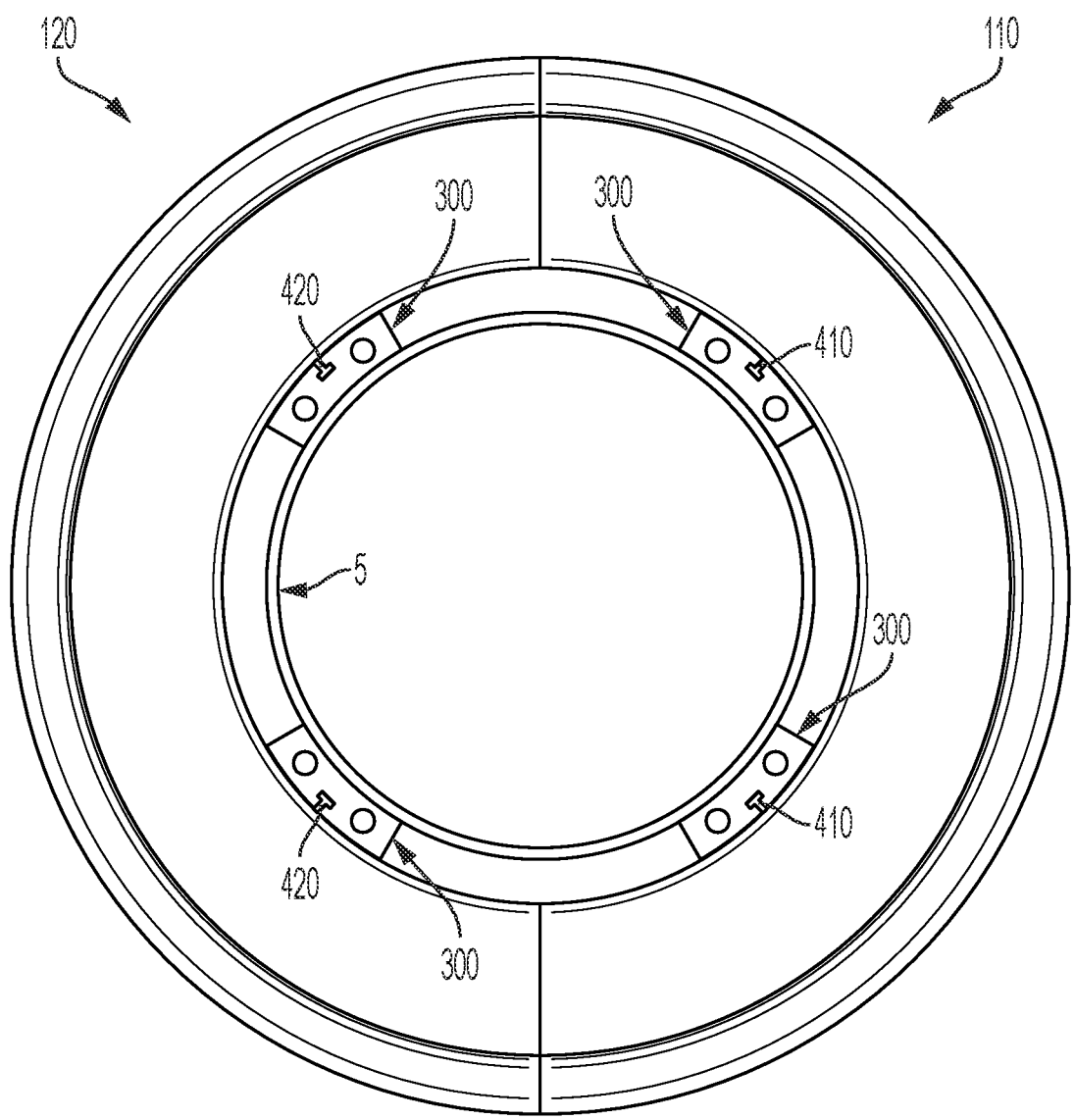
FIG. 19 is a radial cross-section view of a cover for a universal joint of a driveshaft with a pad connected to a driveshaft.
Figure 20:
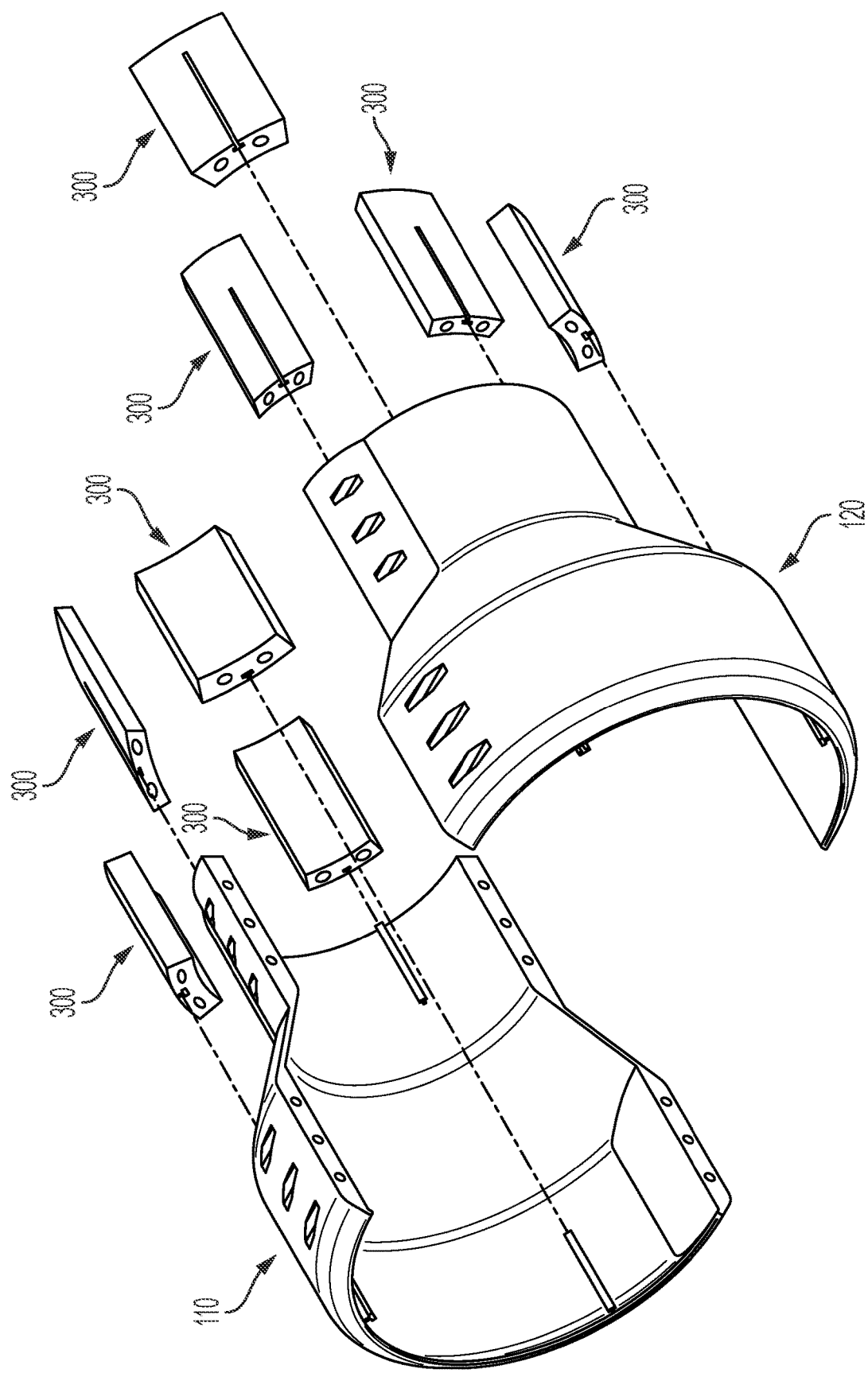
FIG. 20 is a perspective view of an embodiment of a cover kit for a universal joint of a driveshaft.

FIG. 16 illustrates a pad (300). A plurality of pads may be used with any of the covers disclosed herein—including those illustrated in FIGS. 17 to 20—to allow the cover to adapt to driveshafts of varying diameters without changing the size or shape of the cover itself. In some embodiments, the cover may be in the form of a kit (an embodiment of which is shown in FIG. 20) comprising at least a first cover section (110) and a second cover section (120), at least two cover fasteners (130), at least one driveshaft fastener (140), and a plurality of pads. Preferably, at least two pads of the plurality of pads have a different inner arch diameter ($d_2$).

Each pad (300)—when present—has a pad sidewall (310) having a pad inner surface (311) and a pad outer surface (312). When viewed from an end thereof, each pad will have an arched profile with an inner arch diameter formed by extending the inner arch 360 degrees to form a circle.

Figure 17:
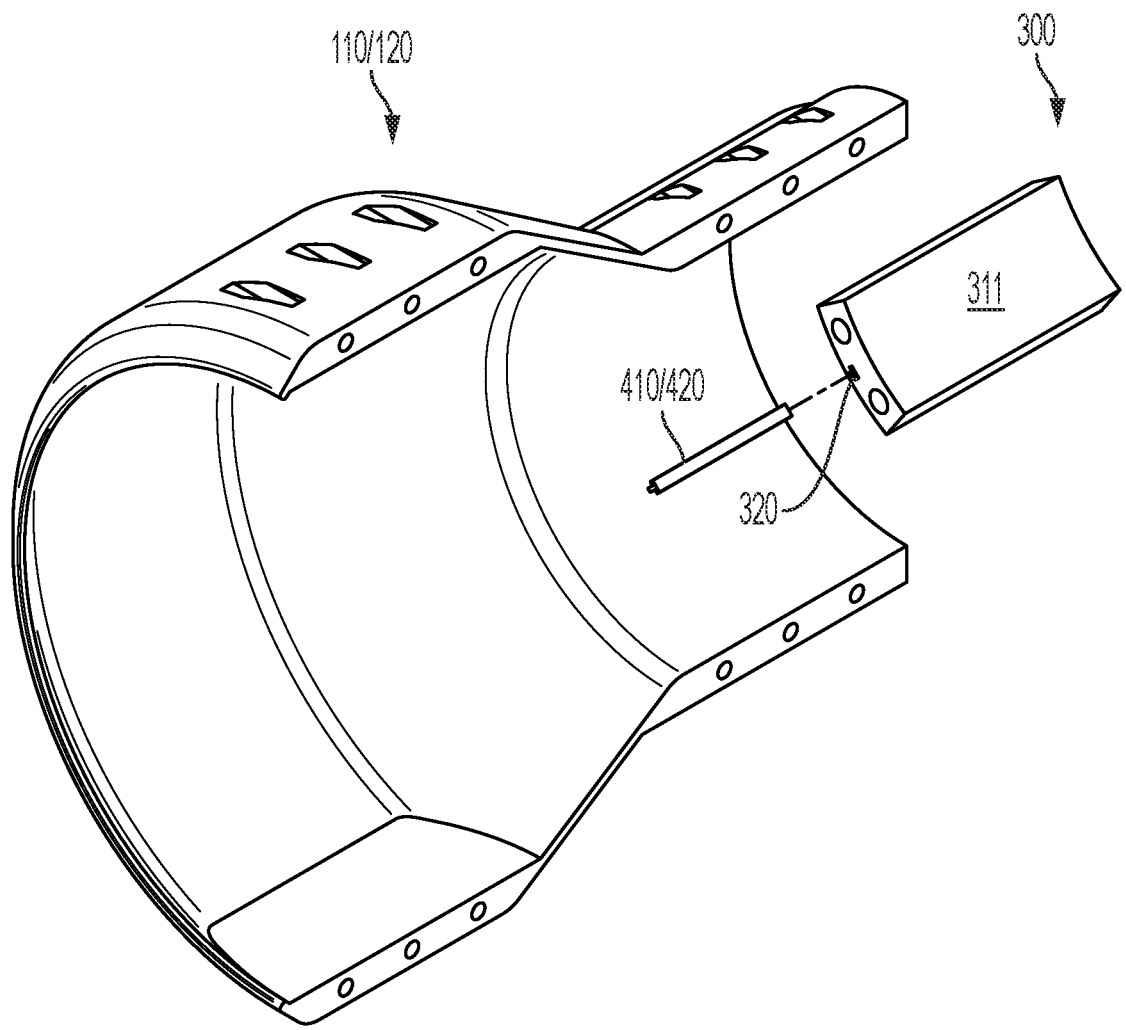
FIG. 17 is an exploded perspective view of a pad with a portion of a cover for a universal joint of a driveshaft.
Figure 18:
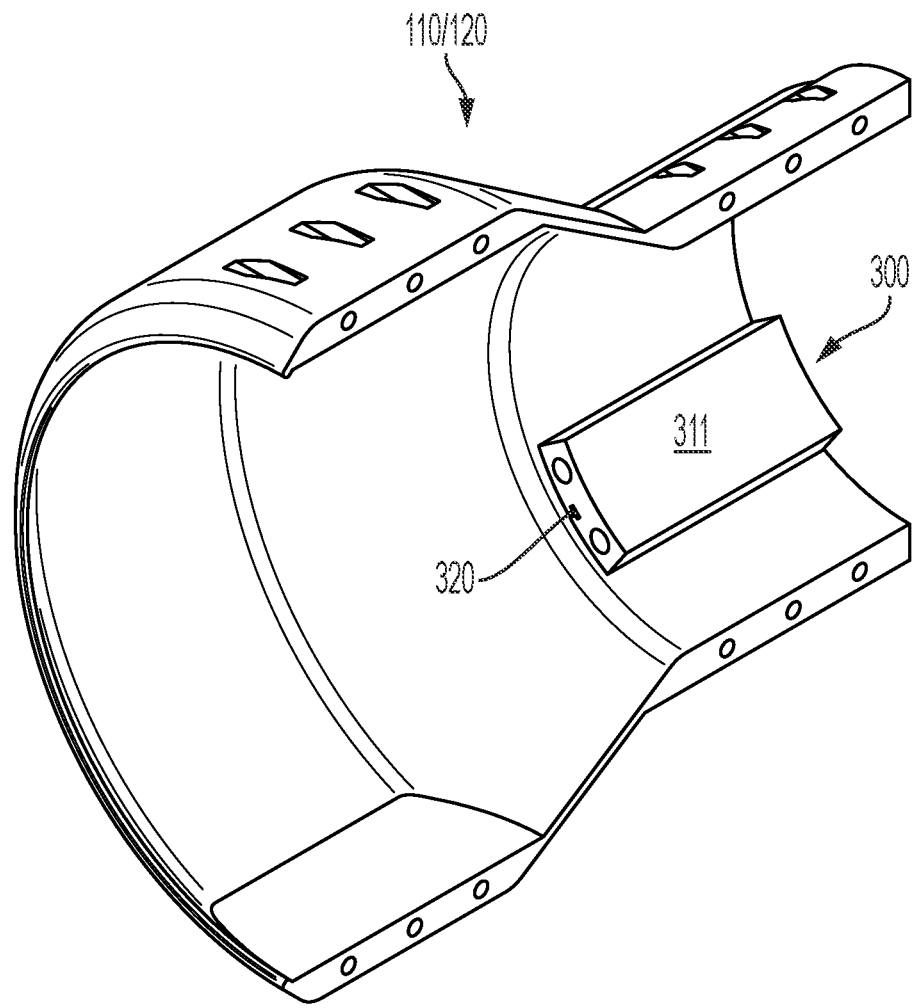
FIG. 18 is an assembled view of FIG. 17.

At or within a portion of the pad outer surface (312) may be a pad attachment member (320). The pad attachment member may take many different forms, an exemplary embodiment of which is shown in FIGS. 16 to 19. In the exemplary embodiment, the pad attachment member is in the form of a groove disposed in the pad outer surface beginning at one circumferential edge of the pad. The groove may have a number of different profiles with the Figures illustrating a "T" profile configured to interact with a "T" shaped attachment member (410/420 as illustrated in FIGS. 17 to 19) of one or both of the first section and/or the second section. While the groove may extend from the first circumferential edge of the pad through the second circumferential edge of the pad, it is preferred that the groove originate at one circumferential edge of the pad without extending through the opposing circumferential edge of the pad as shown in the Figures.

FIG. 17 and FIG. 18 illustrate the connection of a pad (300) to a cover section (which may be the first section (110) or the second section (120)) with FIG. 17 showing the pad and cover section separate (exploded) and FIG. 18 showing the pad and cover section connected to one another. As shown in FIG. 17, the pad attachment member (320) is first aligned with the attachment member (410/420) of the corresponding section. The pad attachment member is then engaged to the attachment member. In the exemplary embodiment shown in FIG. 17 and FIG. 18, the engagement of the pad attachment member to the attachment member occurs by sliding the pad attachment member—which is a groove having a "T" shaped profile—over and around the attachment member—which is a protrusion from the inner sidewall of the cover section also having a "T" shaped profile. However, other embodiments of engagement member may exist including grooves and protrusions having different profiles, a groove in the inner sidewall of the cover section and a protrusion extending from the pad outer surface (312), snaps, and fasteners such as rivets, screws, bolts and the like.

FIG. 19 illustrates a cover (100) comprising a first section (110) and a second section (120) having a plurality of pads (300) attached thereto connected to a segment of a driveshaft (5). As shown in FIG. 19, the plurality of pads is first connected to the first attachment member (410) of the first cover section and the second attachment member (420) of the second cover section respectively. The cover sections—with pads installed—is then disposed around and secured to the section of the driveshaft utilizing the at least two cover fasteners and the at least one driveshaft fastener as described herein.

One or more of the sections of the cover—including the first section, the second section, the optional additional section(s), the plurality of inserts, and the plurality of pads—may be fabricated of a material. Preferably, the material of each of the sections is a semi-rigid polymeric material with the preferred semi-rigid polymeric material being polypropylene or high density polyethylene. By semi-rigid it is meant that the material has a modulus of elasticity greater than 1.90 GPa. Such semi-rigid polymeric materials may be formed into the various sections using various manufacturing techniques known in the art and those yet to be developed. One such example of a manufacturing technique is injection molding.

Alternatively, one or more of the sections of the cover—including the first section, the second section, the optional additional section(s), the plurality of inserts, and the plurality of pads—may be fabricated of a stamped or otherwise formed metal. Examples of such metals include sheet steel, cast aluminum, or the like.

The covers described herein address many of the issues associated with the known solutions for preventing grease/oil from being flung off the universal joint and onto the vehicle and/or the adjacent roadway. By attaching the cover directly to the driveshaft and/or yoke with no portion of the cover contacting the universal joint, the disclosed covers are less prone to becoming damaged by the spinning universal joint. This also reduces the likelihood that debris from a damaged cover will become lodged in the universal joint resulting in partial or full loss of the universal joint's functionality. The multi-piece construction of the covers described herein also allow for the cover to be installed while the driveshaft is already connected to other components of the vehicle—such as the engine, transmission, drive axle, or other driveshaft segments—making installation, repair, and replacement easier. The multi-piece construction also allows for easy access to the universal joint and its associated grease fitting during servicing of the universal joint.

While the invention has been described as having an exemplary design, the present invention may be further modified within the spirit and scope of this disclosure. This application is therefore intended to cover any variations, uses, or adaptations of the invention using its general principles.

What is claimed is:

1. A cover kit (100) for a universal joint (10) of a driveshaft (5), said cover kit comprising:

a first section (110) having a first section first end (111), a first section second end (112) opposite the first section first end, a first section first edge (113) extending between a first section first end first end-point and a first section second end first end point, a first section second edge (114) extending between a first section first end second end-point and a first section second end second end-point, at least one first attachment member (410) extending from a first section inner surface, a first longitudinal axis ($\alpha_1$), and a first radius ($r_1$);

a second section (120) having a second section first end (121), a second section second end (122) opposite the second section first end, a second section first edge (123) extending between a second section first end first end-point and a second section second end first end-point, a second section second edge (124) extending between a second section first end-point and a second section second end second end-point, at least one second attachment member (420) extending from a second section inner surface, a second longitudinal axis ($\alpha_2$), and a second radius ($r_2$);

a plurality of pads (300), each pad of the plurality of pads having a pad sidewall (310) having a pad inner surface (311) and a pad outer surface (312), a pad attachment member (320) located in the pad outer surface, and an inner arch diameter ($d_2$);

wherein each pad of the plurality of pads is configured to fixedly contact the driveshaft;

at least two cover fasteners (130); and at least one driveshaft fastener (140); and wherein at least two pads of the plurality of pads have a different inner arch diameter;

the pad attachment member of each pad of the plurality of pads is configured to connect to a first attachment member of the at least one first attachment member and/or a second attachment member of the at least one second attachment member;

at least a first cover fastener of the at least two cover fasteners is configured to connect the first section first edge to the second section first edge; at least a second cover fastener of the at least two cover fasteners is configured to connect the first section second edge to the second section second edge; and the at least one driveshaft fastener is configured to connect a cover to the driveshaft or to a yoke of the driveshaft without any portion of the cover contacting the universal joint.

2. The cover kit of claim 1, wherein the first section, the second section, and each pad of the plurality of pads are each independently composed of a semi-rigid polymeric material.

* * * * *